(12) United States Patent
Prüssmeier

(10) Patent No.: US 10,291,085 B2
(45) Date of Patent: May 14, 2019

(54) MAGNETIC ASSEMBLY FOR AN ELECTRIC MOTOR

(71) Applicant: BECKHOFF AUTOMATION GMBH, Verl (DE)

(72) Inventor: Uwe Prüssmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 39 days.

(21) Appl. No.: 15/835,916

(22) Filed: Dec. 8, 2017

(65) Prior Publication Data

US 2018/0102681 A1    Apr. 12, 2018

Related U.S. Application Data

(63) Continuation of application No. PCT/EP2016/071180, filed on Sep. 8, 2016.

(30) Foreign Application Priority Data

Sep. 11, 2015   (DE) .................. 10 2015 115 347

(51) Int. Cl.
*H02K 1/18*  (2006.01)
*H02K 41/03* (2006.01)
(Continued)

(52) U.S. Cl.
CPC .............. *H02K 1/18* (2013.01); *H01F 6/006* (2013.01); *H01F 6/06* (2013.01); *H02K 1/27* (2013.01);
(Continued)

(58) Field of Classification Search
CPC ......... H02K 41/03; H02K 41/02; H02K 19/00
See application file for complete search history.

(56) References Cited

U.S. PATENT DOCUMENTS 5,014,028 A * 5/1991 Leupold ................ H01F 7/0278
   315/3.5
7,053,508 B2 * 5/2006 Kusase .................. H02K 1/278
   310/156.27

(Continued)

FOREIGN PATENT DOCUMENTS

CN    103208867 A    7/2013
CN    104333150 A    2/2015
(Continued)

*Primary Examiner* — Thomas Truong
*Assistant Examiner* — Leda T Pham
(74) *Attorney, Agent, or Firm* — Dorsey & Whitney LLP

(57) ABSTRACT

A magnet arrangement for interacting with drive coils of an electric motor comprises a first drive magnet, a second drive magnet, and a compensation magnet arranged between a coil-facing side of the magnet arrangement and a coil-averted side of the magnet arrangement. The compensation magnet is arranged between the first drive magnet and the second drive magnet. The first drive magnet has a first cross-sectional area, the second drive magnet has a second cross-sectional area, and the compensation magnet has a third cross-sectional area; e.g., with a coil-facing width of the first cross-sectional area and a coil-facing width of the second cross-sectional area in each case greater than a coil-facing width of the third cross-sectional area, a coil-averted width of the third cross-sectional area greater than the coil-facing width of the third cross-sectional area, and the third cross-sectional area undercuts the first and second cross-sectional area on the coil-averted side.

13 Claims, 9 Drawing Sheets

(51) Int. Cl.
*H02K 1/27* (2006.01)
*H02K 11/215* (2016.01)
*H02P 25/064* (2016.01)
*H01F 6/00* (2006.01)
*H01F 6/06* (2006.01)
*H02P 6/08* (2016.01)

(52) U.S. Cl.
CPC ......... *H02K 11/215* (2016.01); *H02K 41/031* (2013.01); *H02P 6/08* (2013.01); *H02P 25/064* (2016.02)

(56) References Cited

U.S. PATENT DOCUMENTS

| | | | |
|---|---|---|---|
| 7,538,469 B2 | 5/2009 | Thornton et al. | |
| 8,446,054 B2* | 5/2013 | Toyota | H02K 41/031 310/12.24 |
| 8,863,669 B2 | 10/2014 | Young et al. | |
| 2010/0167556 A1* | 7/2010 | Totsu | H02K 41/03 438/795 |
| 2010/0295385 A1* | 11/2010 | Hsu | H02K 41/03 310/12.18 |
| 2011/0012440 A1* | 1/2011 | Toyota | H02K 1/2786 310/12.24 |
| 2011/0014363 A1 | 1/2011 | Ueno et al. | |
| 2015/0083018 A1 | 3/2015 | Clark et al. | |
| 2015/0137624 A1 | 3/2015 | Wu et al. | |

FOREIGN PATENT DOCUMENTS

| | | |
|---|---|---|
| CN | 104467343 A | 3/2015 |
| DE | 29518104 U1 | 7/1996 |
| DE | 102011075445 A1 | 11/2012 |
| DE | 102012204919 A1 | 10/2013 |
| JP | 2007312449 A | 11/2007 |
| JP | 2010161878 A | 7/2010 |
| WO | 2017042273 A1 | 3/2017 |

* cited by examiner

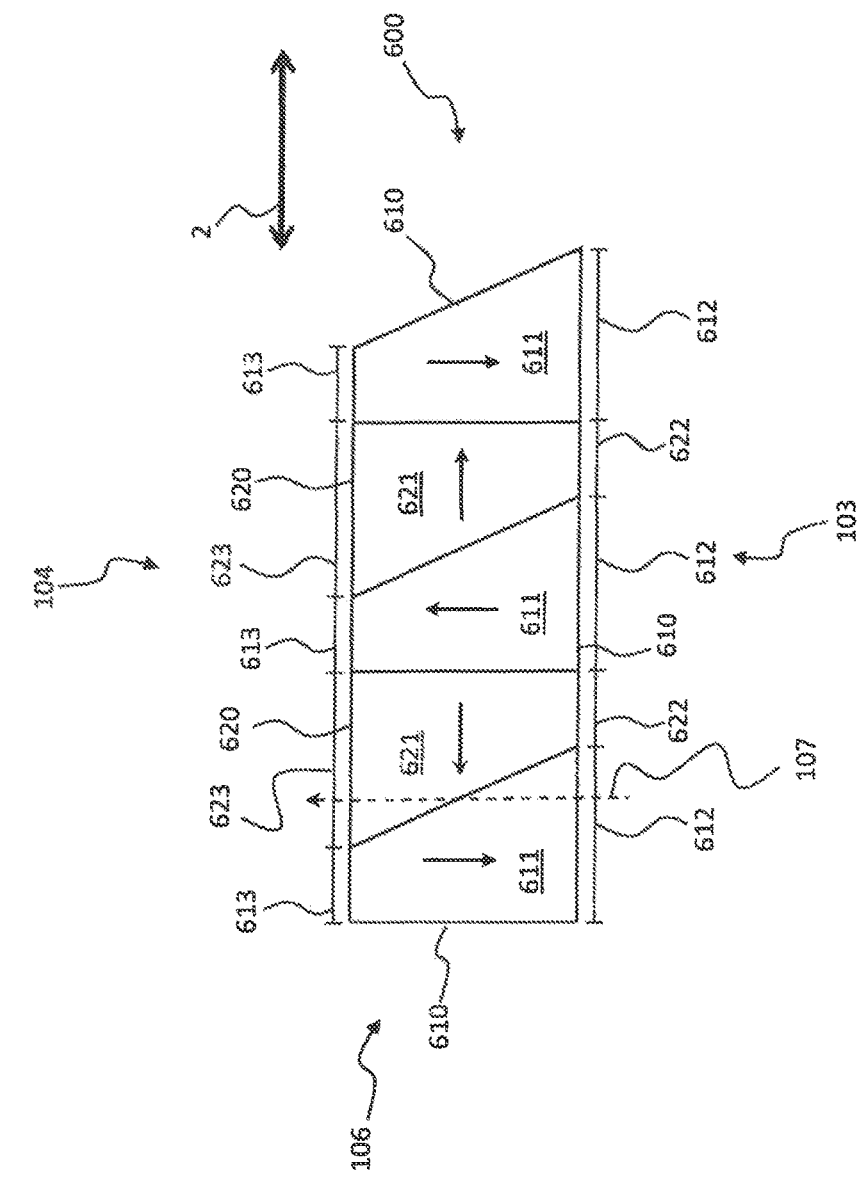

MAGNETIC ASSEMBLY FOR AN ELECTRIC MOTOR

CROSS-REFERENCE TO RELATED APPLICATION

This application claims priority to international application PCT/EP2016/071180, filed Sep. 8, 2016, entitled MAGNETIC ASSEMBLY FOR AN ELECTRIC MOTOR, and German Patent Application DE 10 2015 115 347.5, filed Sep. 11, 2015, entitled MAGNETANRODUNG FÜR EINEN ELEKTIRSCHEN MOTOR, each of which is incorporated by reference herein, in the entirety and for all purposes.

FIELD

The present invention relates to a magnet arrangement for an electric motor, to a mover for an electric motor, and to an electric motor.

BACKGROUND

Electric motors are used inter alia in automation technology for servo motors, stepper motors or linear drives. Electric motors may be configured as rotary motors or configured as linear motors. In the case of a rotary motor, a rotating mover or rotor is driven by electromagnetic interaction with a fixed stator. In the case of a linear motor, the electromagnetic interaction required for the drive occurs between a stator and a mover which is movable along a path.

In the case of permanently excited electric motors, the drive force is generated by electromagnetic interaction between drive magnets and drive coils, through which electrical current flows, of the motor. Depending on the type of construction of the electric motor, it is possible either for the stator of the motor to comprise the drive coils and the mover to comprise the drive magnets, or else for the stator to comprise the drive magnets and the mover to comprise the drive coils.

As drive magnets, use is normally made of permanent magnets in a magnet arrangement composed of multiple drive magnets. Here, adjacent drive magnets of the magnet arrangement have opposite magnetization, such that an alternating magnetic field is generated along the magnet arrangement. The drive coils are normally wound around pole teeth which have a material of high magnetic permeability, generally iron, and which increase the magnetic flux density.

In the case of electric motors with permanent excitation, disruptive cogging torques, in particular cogging torques, arise, which are caused by magnetic interaction of the drive magnets with the pole teeth. The cogging torques can be reduced inter alia by means of an adaptation of the geometries of the drive magnets and of the pole teeth, in particular by means of a suitable adaptation of the number and dimensions of the drive magnets and pole teeth, and by means of a suitable adaptation of the pole coverage factor of the drive magnets.

In designing an electric motor, it is sought to achieve not only a reduction of the cogging torques but also as great as possible and as uniform as possible an introduction of force into the mover, the highest possible dynamics, and as high a power density as possible. The drive force that can be exerted on the mover of the electric motor is normally limited by the maximum magnetic field strength that can be generated by the drive magnets at the location of the drive coils.

To increase the magnetic field strength of the drive magnets at the location of the drive coils, a return plate composed of a ferromagnetic material is often arranged on a side of the magnet arrangement averted from the drive coils. By means of the return plate, the return of the magnetic field lines of the drive magnets on their coil-averted side is improved, and the flux density on the coil-facing side is increased. A magnet arrangement with return plate is described inter alia in the document DE 10 2011 075 445 A1. In the case of an electric motor in which the drive magnets are arranged on the movable mover, a return plate increases the moving mass of the motor, which has an adverse effect on its dynamics.

The magnetic field generated at the drive coils may also be increased by virtue of the drive magnets being arranged in a magnet arrangement configured as a Halbach arrangement. In the case of a Halbach arrangement, between in each case two drive magnets of opposite polarity, there is arranged a compensation magnet, the magnetic field of which intensifies the magnetic field of the drive magnets on the coil-facing side of the magnet arrangement and compensates said magnetic field on the coil-averted side of the magnet arrangement. Document U.S. Pat. No. 8,863,669 B2 describes a use of a magnet arrangement configured as a Halbach arrangement in an electric linear motor. A disadvantage of such a magnet arrangement is that high cogging torques arise here.

The document U.S. Pat. No. 7,538,469 B2 has disclosed an electric linear motor with a magnet arrangement configured as a modified Halbach arrangement. In the case of the modified Halbach arrangement, the compensation magnets of the magnet arrangement have in each case a width which is half that of the drive magnets. This reduces the cogging torques, but leads to only incomplete compensation of the magnetic field on the coil-averted side. Therefore, the magnet arrangement described in document U.S. Pat. No. 7,538,469 B2 comprises a return plate in order to reduce the magnetic resistance for the magnetic field emerging from the magnet arrangement on the coil-averted side.

SUMMARY

Embodiments of the invention provide an improved magnet arrangement for an electric motor, an improved mover for an electric motor and an improved electric motor.

According to one embodiment of the invention, a magnet arrangement for interacting with drive coils of an electric motor comprises a first drive magnet, a second drive magnet and a compensation magnet which are arranged between a coil-facing side of the magnet arrangement and a coil-averted side of the magnet arrangement. The compensation magnet is arranged between the first drive magnet and the second drive magnet. The first drive magnet has a first cross-sectional area, the second drive magnet has a second cross-sectional area and the compensation magnet has a third cross-sectional area. A coil-facing width of the first cross-sectional area and a coil-facing width of the second cross-sectional area is in each case greater than a coil-facing width of the third cross-sectional area. A coil-averted width of the third cross-sectional area is greater than the coil-facing width of the third cross-sectional area, and the third cross-sectional area undercuts the first cross-sectional area and the second cross-sectional area on the coil-averted side.

According to another embodiment of the invention, a mover for an electric motor comprises a magnet arrangement for interacting with drive coils of the electric motor.

According to another embodiment of the invention, an electric motor comprises a mover which has a magnet arrangement for interacting with drive coils of an electric motor, wherein the drive coils of the electric motor interact, by means of pole teeth which are arranged spaced apart from one another by a pole spacing, with the magnet arrangement of the mover, and wherein the highest common denominator of the pole spacing and of a magnet spacing between the first drive magnet and the second drive magnet of the magnet arrangement is equal to one. In the case of such an electric motor, it is never the case at any time that two or more drive magnets have the same relative position with respect to the drive coils, whereby only low cogging torques arise in the event of a movement of the mover relative to the pole teeth of the drive coils.

BRIEF DESCRIPTION OF THE DRAWINGS

The invention will be discussed in more detail below on the basis of figures. Here, in a schematic illustration in each case:

FIG. 9 shows a plan view, sectioned in the section plane, of a fourth alternative magnet arrangement for the mover of the electric motor.

DETAILED DESCRIPTION

Figure 1:
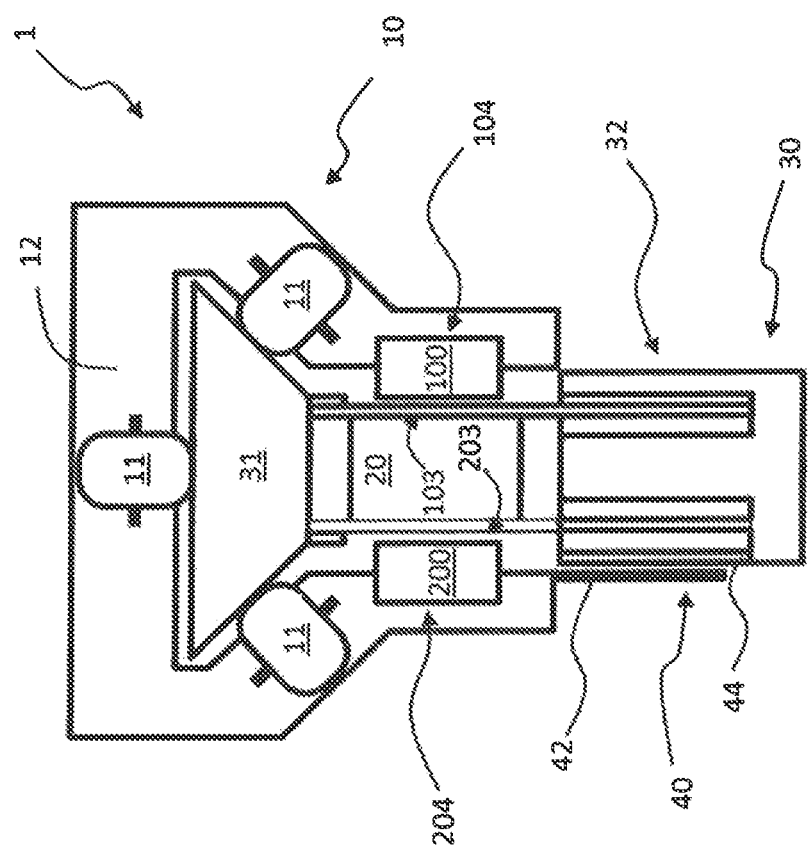
FIG. 1 shows a frontal sectional view of an electric motor having a stator and having a mover with a magnet arrangement.

FIG. 1 shows a frontal sectional view of an electric motor 1. The electric motor 1 is configured as a linear synchronous motor and comprises a stator 30 and a mover 10 which is movable along the stator 30. The mover 10 is movable, perpendicular to the section plane of the view illustrated in FIG. 1, along the stator 30. The stator 30 comprises a running rail 31 and a stator housing 32. The mover 10 comprises a U-shaped mover body 12 and three rollers 11. The rollers 11 bear against the running rails 31 of the stator 30 such that the mover 10 is guided along the stator 30 by means of the rollers 11 and the running rail 31.

The electric motor 1 comprises a position detection system 40 which is configured as an inductive position detection system. The position detection system 40 comprises an encoder lug 42 arranged on the mover 10 and a receiver board 44 arranged on the stator 30. The encoder lug 42 and the receiver board 44 are arranged opposite one another. During a movement of the mover 10 along the stator 30, the encoder lug 42 is moved along the receiver board 44 with a constant spacing. The receiver board 44 detects the relative change in position of the encoder lug 42 and transmits a corresponding signal to a superordinate control system of the electric motor 1.

For the drive of the mover 10, the stator 30 of the electric motor 1 comprises multiple drive coils 20 arranged along the stator 30. In the sectional view illustrated in FIG. 1, only one of the drive coils 20 is visible, with further drive coils 20 being arranged in front of and behind the illustrated drive coil 20. A magnet arrangement 100 and a further magnet arrangement 200 are arranged on the mover 10 so as to be situated opposite the drive coils 20. The magnet arrangement 100 and the further magnet arrangement 200 form the exciter system of the electric motor 1. They comprise multiple drive magnets which interact with a magnetic field generated by the drive coils 20. Analogously to the drive coils, FIG. 1 illustrates in each case one of the drive magnets of the magnet arrangement 100, 200, and the other drive magnets are situated behind and in front of the illustrated drive magnet.

The drive coils 20 of the electric motor 1 are situated opposite the magnet arrangement 100 on a coil-facing side 103 of the magnet arrangement 100. The magnet arrangement 100 is fastened to the mover body 12 of the mover 10 on a coil-averted side 104. Analogously, the drive coils 20 are situated opposite the further magnet arrangement 200 on a coil-facing side 203 of the further magnet arrangement 200, whereas the further magnet arrangement 200 is fastened to the mover body 12 on a coil-averted side 204 of the further magnet arrangement 200.

To move the mover 10 along the stator 30, an alternating magnetic field is generated by the drive coils 20 of the stator 30, which alternating magnetic field is propagated along the stator. The magnetic field generated by the drive coils 20 can thus also be referred to as a magnetic travelling field. The periodicity of the drive magnets and of the alternating magnetic field are coordinated with one another such that, during the propagation of the alternating field along the stator 30, the magnet arrangements 100, 200, and thus also the mover 10, are moved conjointly with the alternating field.

Figure 2:
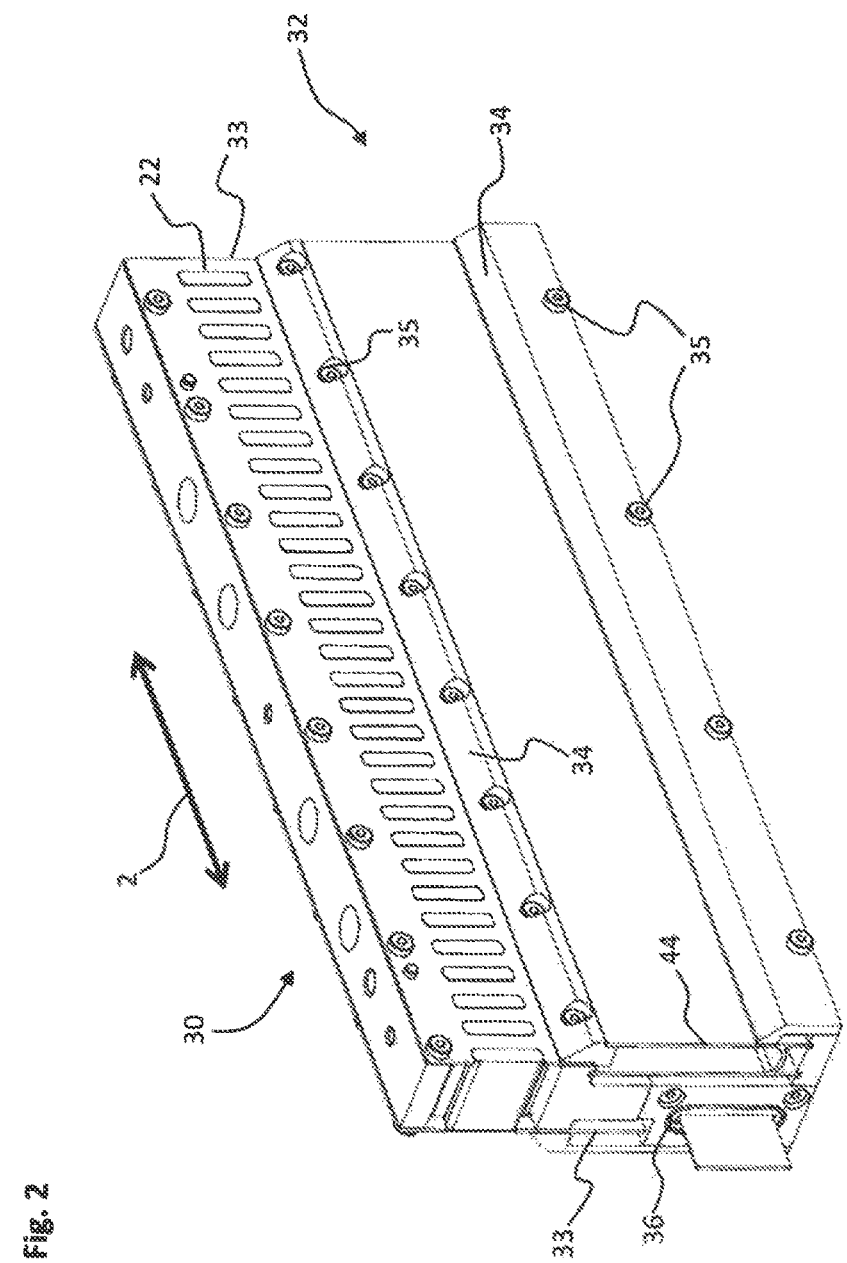
FIG. 2 shows a perspective view of the stator of the electric motor.

FIG. 2 shows a perspective view of the stator 30 of the electric motor 1. A path 2 along which the mover 10 of the electric motor 1 is movable is indicated by a double arrow. The stator 30 may comprise multiple stator modules arranged so as to adjoin one another along the path 2. FIG. 2 illustrates a single one of said stator modules. The running rail 31 arranged on the modules is not illustrated in FIG. 2.

The stator 30 comprises a multiplicity of pole teeth 22 which are arranged within the stator 30 so as to be spaced apart from one another along the path 2. The pole teeth 22 are of substantially rod-shaped configuration and are oriented transversely with respect to the path 2. They are, at their two end-side face surfaces, arranged in each case in a cutout of a circuit board 33. The circuit boards 33 form in each case one outer wall of the stator housing 32. In this way, the face surfaces of the pole teeth 22 are in each case exposed at outer surfaces of the stator housing 32.

In addition to the circuit boards 33, the receiver board 44 of the position detection system 40 likewise forms an outer wall of the stator housing 32. The circuit boards 33 and the receiver board 44 are connected to one another by means of multiple fastening rails 34 and bolts 35. At a face side, the stator module of the stator 30 as illustrated in FIG. 2 has a connecting element 36. By means of the connecting element 36, the stator module can be connected in electrically conductive fashion to a further stator module arranged so as to adjoin the face side.

The pole teeth 22 each have central axes which are oriented from one of the end-side face surfaces in the direction of the other end-side face surface. The central axes of the pole teeth 22 are thus oriented transversely with respect to the path 2 and perpendicular to the circuit boards 33 which form the outer walls of the stator 30. Every second one of the pole teeth 22 is enwound with a coil winding of the drive coils 20. The enwound pole teeth 22 thus form in each case one coil tooth of the electric motor 1, and the central axes of the enwound pole teeth 22 form in each case one coil axis. The pole teeth 22 intensify and focus the magnetic field generated by the drive coils 20 and conduct said magnetic field in each case outward at their end-side face surfaces. The pole teeth 22 are composed of a material with a high magnetic permeability and a low coercive field strength. The pole teeth 22 may for example be composed of soft iron.

Figure 3:
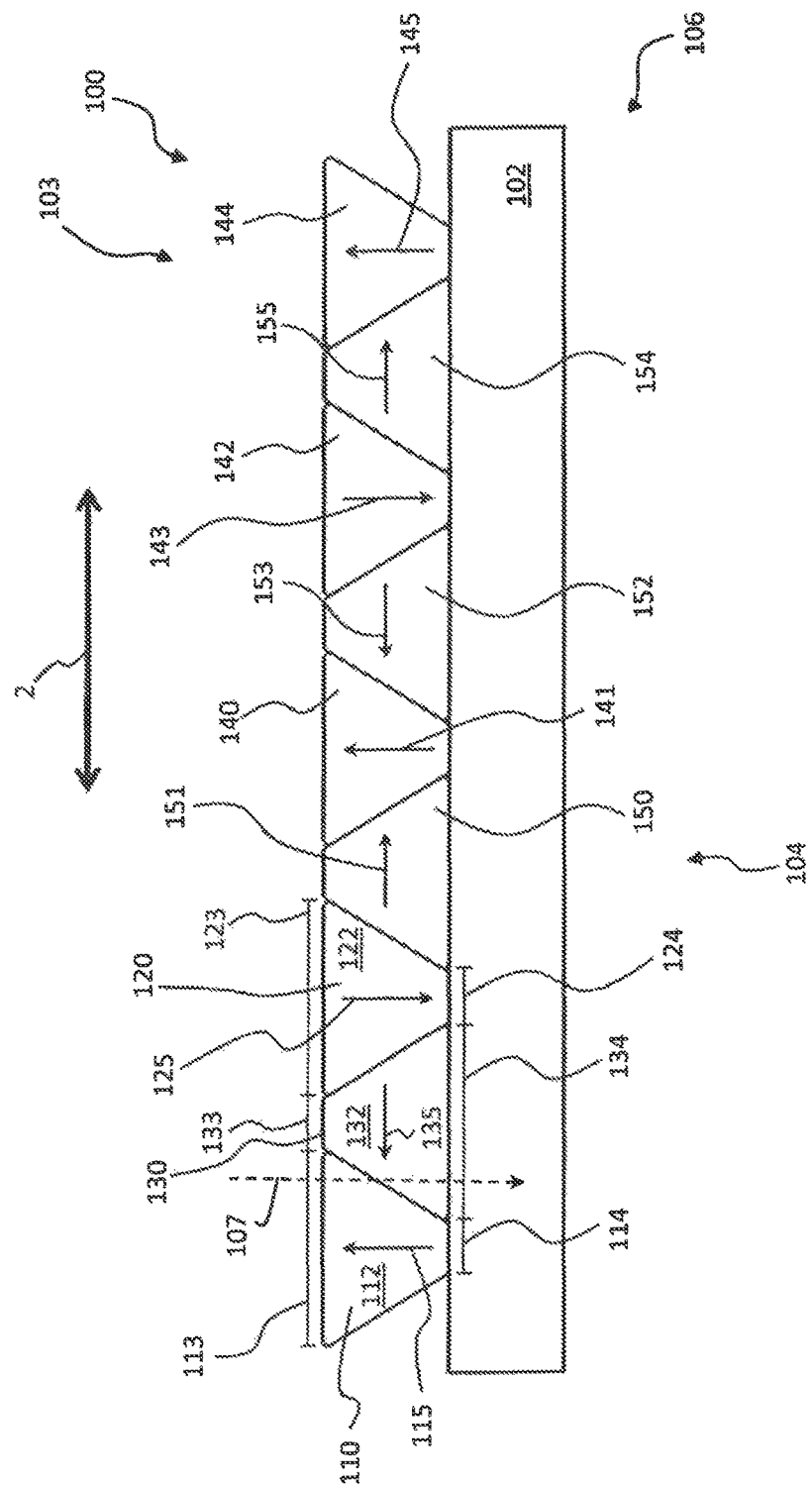
FIG. 3 shows a plan view, sectioned in a section plane, of the magnet arrangement of the mover of the electric motor.

FIG. 3 shows, in a schematic illustration, a sectional plan view of the magnet arrangement 100 of the mover 10 of the electric motor 1 as shown in FIG. 1. The sectional view illustrated in FIG. 3 shows the magnet arrangement 100 in a section plane 106 which is oriented parallel to the path 2 and in which the coil axes or the central axes of the coil teeth of the drive coils 20 of the electric motor 1 are situated.

The magnet arrangement 100 has a first drive magnet 110, a second drive magnet 120, and a compensation magnet 130. The first drive magnet 110, the compensation magnet 130 and the second drive magnet 120 are arranged adjacent to one another, and so as to adjoin one another, along the path 2. Here, the compensation magnet 130 is arranged between the first drive magnet 110 and the second drive magnet 120 along the path 2. Furthermore, the magnet arrangement 100 comprises a first further compensation magnet 150 which is arranged so as to adjoin the second drive magnet 120 along the path 2. The first further compensation magnet 150 is adjoined, along the path 2, by a first further drive magnet 140, followed by a second further compensation magnet 152, followed by a second further drive magnet 142, followed by a third further compensation magnet 154, and finally followed by a third further drive magnet 144.

In the section plane 106, the first drive magnet 110 has a first cross-sectional area 112, the second drive magnet has a second cross-sectional area 122, and the compensation magnet 130 has a third cross-sectional area 132. The first, second and third cross-sectional areas 112, 122, 132 are arranged in each case between the coil-facing side 103 and the coil-averted side 104 of the magnet arrangement 100. In the magnet arrangement 100, the first, second and third cross-sectional areas 112, 122, 132 extend between the coil-facing side 103 and the coil-averted side 104 of the magnet arrangement 100, that is to say the first, second and third cross-sectional areas 112, 122, 132 have in each case one side or edge which forms a part of the coil-facing side 103 and in each case one side or edge which forms a part of the coil-averted side 104 of the magnet arrangement 100.

In alternative embodiments, the first, second or third cross-sectional area 112, 122, 132 may however also be arranged between the coil-facing side 103 and the coil-averted side 104 so as not to extend all the way to the coil-averted and/or coil-facing side 104, 103.

The first cross-sectional area 112, the second cross-sectional area 122 and the third cross-sectional area 132 are configured in each case as an isosceles trapezoid. The first cross-sectional area 112, the second cross-sectional area 122 and the third cross-sectional area 132 have the same dimensions in each case. In particular, the surface areas of the first cross-sectional area 112, of the second cross-sectional area 122 and of the third cross-sectional area 132 are in each case of equal size.

The base sides of the first cross-sectional area 112, second cross-sectional area 122 and third cross-sectional area 132 of trapezoidal configuration are situated in each case on the coil-facing side 103 and on the coil-averted side 104 of the magnet arrangement 100, such that the first, second and third cross-sectional areas 112, 122, 132 extends between the coil-facing side 103 and the coil-averted side 104 of the magnet arrangement 100. The base sides of the cross-sectional areas 112, 122, 132 are oriented in each case parallel to the path 2.

At the base side situated on the coil-facing side 103, the first cross-sectional area 112 has a coil-facing width 113 which is greater than a coil-averted width 114 of the first cross-sectional area 112 at the base side situated on the coil-averted side 104. The second cross-sectional area 122 of the second drive magnet 120 is oriented and configured in the same way as the first cross-sectional area 112 of the first drive magnet 110. In particular, on the coil-facing side 103, the second cross-sectional area 122 has a coil-facing width 123 which is greater than a coil-averted width 124 of the second cross-sectional area 122. The cross-sectional areas 112, 122 of the drive magnets 110, 120 thus narrow from the coil-facing side 103 in the direction of the coil-averted side 104 of the magnet arrangement 100.

A coil-facing width 133 of the third cross-sectional area 132 on the coil-facing side 103 is smaller than a coil-averted width 134 of the third cross-sectional area 132 on the coil-averted side 104. The third cross-sectional area 132 thus widens from the coil-facing side 103 in the direction of the coil-averted side 104. In the magnet arrangement 100, the third cross-sectional area 132 of the compensation magnet 130 has the same shape and the same dimensions as the first cross-sectional area 112 and the second cross-sectional area 122, but is rotated through 180 degrees in relation thereto. The coil-facing width 133 of the third cross-sectional area 132 corresponds to the coil-averted widths 114, 124 of the first and second cross-sectional areas 112, 122. Furthermore, the coil-facing width 113 of the first cross-sectional area 112 and the coil-facing width 123 of the second cross-sectional area 122 correspond to the coil-averted width 134 of the third cross-sectional area 132.

The third cross-sectional area 132 undercuts in each case the first and the second cross-sectional area 112, 122 on the coil-averted side 104. Consequently, in a transverse direction 107 which lies in the section plane 106 and which is perpendicular to the path 2 or to the coil-averted and coil-facing sides 103, 104 of the magnet arrangement 100, parts of the first and the second cross-sectional area 112, 122 which are situated in the direction of the coil-facing side 103 are arranged in front of parts of the third cross-sectional area 132 which are situated in the direction of the coil-averted side 104. In the magnet arrangement 100, parts of the first and of the second cross-sectional area 112, 122 which adjoin the coil-facing side 103 are, in the transverse direction 107, situated in front of parts of the third cross-sectional area 132 which adjoin the coil-averted side 104. Specifically, parts of the base sides, arranged on the coil-facing side 103, of the trapezoidal first and second cross-sectional areas 112, 122 are, in the transverse direction 107, situated in front of parts of the base sides, arranged on the coil-averted side 104, of the trapezoidal third cross-sectional area 132.

An arrangement in which the third cross-sectional area 132 of the compensation magnet 130 undercuts the first and second cross-sectional areas 112, 122 of the first and second drive magnets 110, 120 is achieved in the case of the first magnet arrangement 100 in that the first and the second cross-sectional area 112, 122 narrow from the coil-facing side 103 in the direction of the coil-averted side 104 and the third cross-sectional area 132 widens from the coil-facing side 103 in the direction of the coil-averted side 104.

The first drive magnet 110 has a magnetization 115 which is oriented parallel to the section plane 106 and perpendicular to the path 2 and which is directed from the coil-averted side 104 of the magnet arrangement 100 in the direction of the coil-facing side 103 of the magnet arrangement 100. The second drive magnet 120 has a magnetization 125 which is likewise oriented parallel to the section plane 106 and perpendicular to the path 2 and which is directed oppositely to the magnetization 115 of the first drive magnet 110. Consequently, the magnetization 125 of the second drive magnet 120 is oriented from the coil-facing side 103 of the magnet arrangement 100 in the direction of the coil-averted side 104 of the magnet arrangement 100.

The compensation magnet 130 has a magnetization 135 which is oriented parallel to the section plane 106 and parallel to the path 2 and which is directed from the second drive magnet 120 in the direction of the first drive magnet 110. In this way, the magnetization 135 of the compensation magnet 130 is directed from a drive magnet which is magnetized in the direction of the coil-averted side 104 to a drive magnet which is magnetized in the direction of the coil-facing side 103.

The magnetization 135 of the compensation magnet 130 is thus oriented such that the magnetic field generated by the first drive magnet 110 and the second drive magnet 120 on the coil-facing side 103 of the magnet arrangement 100, which magnetic field is directed from the first drive magnet 110 in the direction of the second drive magnet 120, is intensified by the magnetic field generated by the compensation magnet 130. Analogously to this, the magnetic field generated by the first drive magnet 110 and the second drive magnet 120 on the coil-averted side 104 of the magnet arrangement 100, which magnetic field is oriented from the second drive magnet 120 in the direction of the first drive magnet 110, is attenuated or compensated by the magnetic field of the compensation magnet 130.

In the magnet arrangement 100, the dimensions of the drive magnets 110, 120 and of the compensation magnet 130 are selected such that, in an interaction of the magnets of the magnet arrangement 100 with the drive coils 20 of the electric motor 1, firstly as great as possible a transmission of force to the mover 10, which has the magnet arrangement 100, is realized, and secondly only low cogging torques arise during a movement of the mover 10 along the stator 30.

The magnitude of the cogging torques that arise during a movement of the mover 10 with the magnet arrangement 100 relative to the pole teeth 22 of the stator 30 is influenced significantly by the ratio between the coil-facing widths 113, 123 of the first and second cross-sectional areas 112, 122 and the coil-facing width 133 of the third cross-sectional area 132, or by the spacing between the first and second cross-sectional areas 112, 122 on the coil-facing side 103. In the magnet arrangement 100, said ratio is configured such that cogging torques are minimized. In particular, the coil-facing width 113, 123 of the first and of the second cross-sectional area 112, 122 of the drive magnets 110, 120 is greater than the spacing between the first and the second drive magnet 110, 120, wherein said spacing corresponds to the coil-facing width 133 of the third cross-sectional area 132 of the compensation magnet 130.

The ratio between the coil-averted widths 114, 124 of the first and second cross-sectional areas 112, 122 and the coil-averted width 134 of the third cross-sectional area 132 is the primary factor that determines the intensification of the magnetic fields of the drive magnets 110, 120 by the magnetic field of the compensation magnet 130 on the coil-facing side 103. In the magnet arrangement 100, the coil-averted widths 114, 124 of the first and second cross-sectional areas 112, 122 are smaller than the coil-averted width 134 of the third cross-sectional area 132. In alternative embodiments of the magnet arrangement 100, an intensification of the magnetic field of the drive magnets 110, 120 may also be achieved if the coil-averted widths 114, 124 of the first and second cross-sectional areas 112, 122 of the drive magnets 110, 120 are greater than the coil-averted width 134 of the third cross-sectional area 132 of the compensation magnet 130.

The first further drive magnet 140 and the third further drive magnet 144 are designed and magnetized in the same way as the first drive magnet 110. In particular, the first further drive magnet 140 has a magnetization 141, and the third further drive magnet 144 has a magnetization 145, which is in each case oriented from the coil-averted side 104 in the direction of the coil-facing side 103 of the magnet arrangement 100. The second further drive magnet 142 is designed in the same way as the second drive magnet 120, that is to say has in particular a magnetization 143 which is oriented from the coil-facing side 103 of the magnet arrangement in the direction of the coil-averted side 104.

The first further drive magnet 140, the second further drive magnet 142 and the third further drive magnet 144 have in each case the same dimensions as the first drive magnet 110, the second drive magnet 120 and compensation magnet 130. In particular, the first further drive magnet 140, the second further drive magnet 142 and the third further drive magnet 144 have in each case a greater width on the coil-facing side 103 than on the coil-averted side 104. In the first magnet arrangement 100, the further drive magnets 140, 142, 144 are, like the drive magnets 110, 120, configured in each case as isosceles trapezoids.

Where no differences are described, the first further compensation magnet 150, the second further compensation magnet 152 and the third further compensation magnet 154 are designed in the same way as the compensation magnet 130. In particular, shapes and dimensions of the first further compensation magnet 150, of the second further compensation magnet 152 and of the third further compensation magnet 154 correspond in each case to the shape and dimension of the compensation magnet 130, that is to say the further compensation magnets 150, 152, 154 have in each case a smaller width on the coil-facing side 103 than on the coil-averted side 104, and said widths correspond in each case to the corresponding widths of the compensation magnet 130. In the magnet arrangement 100, the further compensation magnets 150, 152, 154 are, like the compensation magnet 130, of trapezoidal configuration.

The first further compensation magnet 150 arranged between the second drive magnet 120 and the first further drive magnet 140 has a magnetization 151 which is oriented from the second drive magnet 120 in the direction of the first further drive magnet 140 and which is oriented parallel to the path 2. The second further compensation magnet 152 which is arranged between the first further drive magnet 140 and the second further drive magnet 142 has a magnetization 153 which is directed from the second further drive magnet 142 in the direction of the first further drive magnet 140 and which is oriented parallel to the path 2. The third further compensation magnet 154 which is arranged between the second further drive magnet 142 and the third further drive magnet 144 has a magnetization 155 which is oriented parallel to the path 2 and from the second further drive magnet 142 in the direction of the third further drive magnet 144.

The magnetization 115, 125, 141, 143, 145 of the drive magnets 110, 120, 140, 142, 144 of the magnet arrangement 100 is thus oriented in each case alternately in the direction of the coil-facing side 103 and of the coil-averted side 104. In this way, the drive magnets 110, 120, 140, 142, 144 generate, on the coil-facing side 103, a spatially alternating magnetic alternating field for interacting with the drive coils 20 of the electric motor 1.

In the manner of a Halbach magnet arrangement, the compensation magnets 130, 150, 152, 154 are in each case magnetized such that their magnetization is directed from a drive magnet which is magnetized in the direction of the coil-averted side 104 in the direction of a drive magnet which is magnetized in the direction of the coil-facing side 103. Thus, by means of the compensation magnets 130, 150, 152, 154, the magnetic field that is generated by the drive magnets 110, 120, 140, 142, 144 is in each case intensified on the coil-facing side 103 and is in each case attenuated or compensated on the coil-averted side 104.

The base sides of the trapezoidal cross-sectional areas of the drive magnets 110, 120, 140, 142, 144 and of the compensation magnets 130, 150, 151, 152, 154 are in each case aligned flush with one another on the coil-facing side 103 and on the coil-averted side 104. In particular, the base sides of the first cross-sectional area 112, of the second cross-sectional area 122 and of the third cross-sectional area 132 are aligned in each case flush with one another on the coil-facing side 103 and on the coil-averted side 104. This yields in each case straight sides or edges of the magnet arrangement 100 on the coil-facing side 103 and on the coil-averted side 104.

The magnet arrangement 100 is, on its coil-averted side 104, arranged on a carrier device 102. The carrier device 102 has, in the section plane 106, on its side facing toward the coil-averted side 104 of the magnet arrangement 100, a substantially planar side surface. The carrier device 102 is composed of a non-magnetic material or has a non-magnetic material of said type. The non-magnetic material is substantially free from ferromagnetic constituents and has a relative magnetic permeability of close to one. Thus, no field lines of the magnetic field generated by the magnets of the magnet arrangement 100 are concentrated in the non-magnetic material. In particular, the carrier device 102 thus does not function as a return plate for the magnet arrangement 100. The carrier device 102 may be composed for example of aluminum or of a plastic.

The magnet arrangement 100 may also be arranged directly on the mover 10, for example on the mover body 12, rather than on the carrier device 102. Like the carrier device 102, the mover body 12 may be composed of a non-magnetic material, for example of aluminum, such that the mover body 12 also does not function as a return plate for the magnet arrangement 100.

Figure 4:
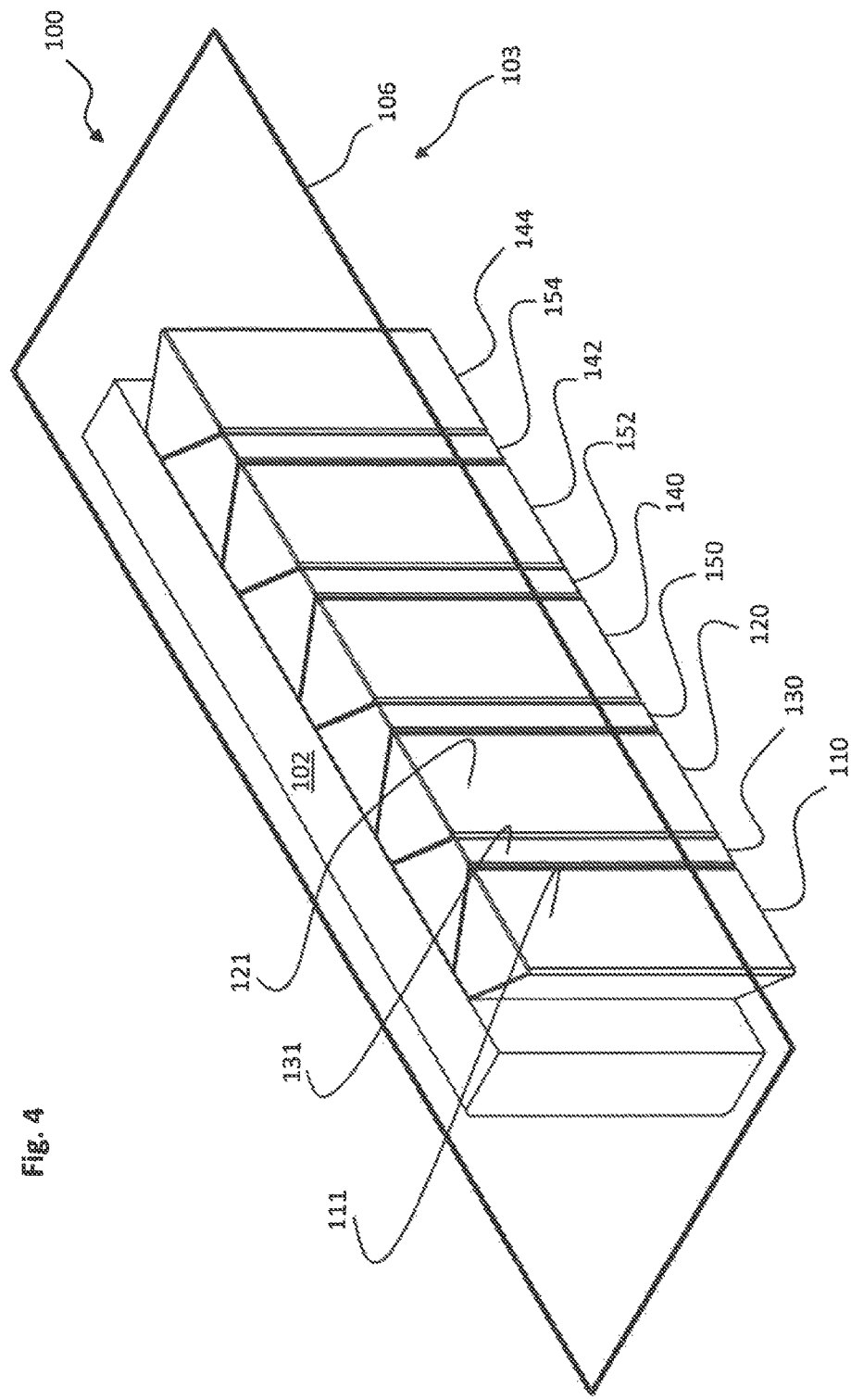
FIG. 4 shows a perspective view of the magnet arrangement of the mover of the electric motor.

FIG. 4 shows a schematic illustration of a perspective view of the magnet arrangement 100 of the mover 10 of the electric motor 1 with the carrier device 102, as shown in FIG. 1. The drive magnets 110, 120, 140, 142, 144 and the compensation magnets 130, 150, 152, 154 are configured in each case as straight cylinders. The cylindrical drive magnets 110, 120, 140, 142, 144 and compensation magnets 130, 150, 152, 154 each have base surfaces which correspond in each case to the cross-sectional areas in the section plane 106 as illustrated in FIG. 3. In particular, the base surfaces of the first drive magnet 110, of the second drive magnet 120 and of the compensation magnet 130 correspond in each case to the first cross-sectional area 112, to the second cross-sectional area 122 and to the third cross-sectional area 132.

Since the drive magnets 110, 120, 140, 142, 144 and the compensation magnets 130, 150, 152, 154 of the magnet arrangement 100 are configured as cylinders, the cross section of the drive magnets 110, 120, 140, 142, 144 and the compensation magnets 130, 150, 152, 154 of the magnet arrangement 100 corresponds to the illustrations of FIG. 3 in every section plane parallel to the section plane 106. In particular, the drive magnets 110, 120, 140, 142, 144 and the compensation magnets 130, 150, 152, 154 of the magnet arrangement 100 have, in each of said section planes, cross-sectional areas which are of the same design as the first cross-sectional area 112, the second cross-sectional area 122 and the third cross-sectional area 132.

On the coil-facing side 103, the first drive magnet 110 has a coil-facing side surface 111, the second drive magnet 120 has a coil-facing side surface 121, and the compensation magnet 130 has a coil-facing side surface 131. The coil-facing side surfaces 111, 121, 131 are in each case rectangular. The width of the coil-facing side surface 111 of the first drive magnet 110 along the path 2 corresponds to the coil-facing width 113 of the first cross-sectional area 112, and analogously, the widths of the coil-facing side surfaces 121, 131 of the second drive magnet 120 and of the compensation magnet 130 along the path 2 correspond to the coil-facing width 123 of the second cross-sectional area 122 and to the coil-facing width 133 of the third cross-sectional area 132. Perpendicular to the section plane 106, the height of the side surfaces 111, 121, 131, and thus the height of the magnets 110, 120, 130, may for example correspond to the height of the face surfaces, which are exposed on the stator housing 32, of the pole teeth 22.

On the coil-facing side 103, the further drive magnets 140, 142, 144 and the further compensation magnets 150, 152, 154 have in each case side surfaces which are designed in the same way as the side surfaces 111, 121 of the drive magnets 110, 120 and the side surface 131 of the compensation magnet 130.

Figure 5:
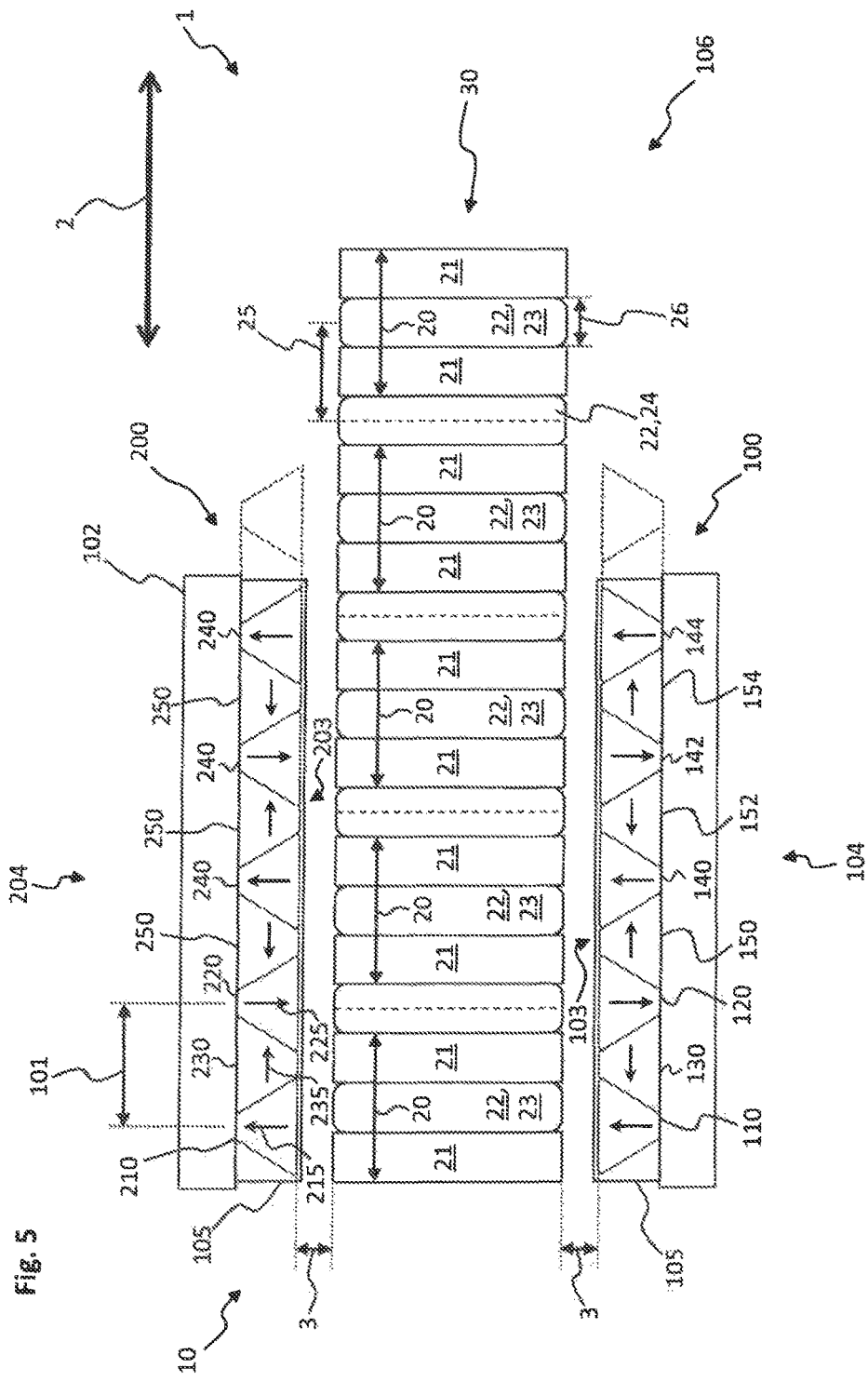
FIG. 5 shows a plan view, sectioned in the section plane, of the mover and the stator of the electric motor.

FIG. 5 shows a schematic illustration of a plan view, sectioned in the section plane 106, of the stator 30 and the mover 10 of the electric motor 1.

FIG. 5 illustrates the pole teeth 22 of the stator 30. Around every second one of the pole teeth 22 arranged along the path 2 there is wound in each case one coil winding 21 of the drive coils 20 of the electric motor 1. The enwound pole teeth 22 each form coil teeth 23 of the electric motor 1. Of the coil windings 21, FIG. 5 illustrates in each case the cross-sectional areas situated between the pole teeth 22 in the section plane 106. The coil windings 21 and the coil teeth 23 each form constituent parts of the drive coils 20 of the electric motor 1. The pole teeth 22 between the drive coils 20 form in each case intermediate teeth 24 which are not enwound with one of the coil windings 21.

FIG. 5 illustrates a total of five drive coils 20 with coil teeth 23 and four intermediate teeth 24. The magnetic field through the coil teeth 23 is determined in each case by the current flow through that one of the coil windings 21 which is wound around the respective coil tooth 23. The magnetic field through one of the intermediate teeth 24 is determined in each case from the current flows through the coil windings 21 of the two drive coils 20 arranged adjacent to the respective intermediate tooth 24.

Of the mover 10, FIG. 5 illustrates, in cross section, the magnet arrangement 100 arranged on one side of the stator 30 and the further magnet arrangement 200 arranged on the opposite side of the stator 30. Where no differences are described below, the further magnet arrangement 200 is designed in the same way as the magnet arrangement 100 and is also arranged and fastened on the mover 10 in the same way as the magnet arrangement 100.

The further magnet arrangement 200 comprises, in particular, a first drive magnet 210, a second drive magnet 220 and a compensation magnet 230 which is arranged between the first and second drive magnets 210, 220 along the path 2 and which is arranged so as to adjoin the first and second drive magnets 210, 220. The further magnet arrangement 200 furthermore comprises three further drive magnets 240 and three further compensation magnets 250, wherein the further drive magnets 240 are arranged so as to adjoin the second drive magnets 220 along the path 2, and the further compensation magnets 250 are arranged in each case between the further drive magnets 240, and so as to adjoin the latter, along the path 2. Thus, the further magnet arrangement 200, like the magnet arrangement 100, comprises a total of five drive magnets 210, 220, 240 and four compensation magnets 230, 250.

Where no differences are described below, the drive magnets 210, 220, 240 and the compensation magnets 230, 250 of the further magnet arrangement 200 are designed in the same way as the drive magnets 110, 120, 140, 142, 144 and the compensation magnets 130, 150, 152, 154 of the magnet arrangement 100 as already described above. The first drive magnet 210 of the further magnet arrangement 200 is arranged on the mover 10 so as to be situated opposite the first drive magnet 110 of the magnet arrangement 100. Analogously, the second drive magnet 220 and the compensation magnet 230 of the further magnet arrangement 200 are arranged on the mover 10 so as to be situated opposite the second drive magnet 120 and the compensation magnet 130 respectively of the magnet arrangement 100. The further drive magnets 240 and the further compensation magnets 250 of the further magnet arrangement 200 are arranged on the mover 20 so as to be situated in each case opposite the further drive magnets 140, 142, 144 and the further compensation magnets 150, 152, 154 respectively of the magnet arrangement 100.

Each of the drive magnets 210, 220, 240 of the further magnet arrangement 200 is, in the section plane 106, magnetized in each case in the same direction as the respectively opposite one of the drive magnets 110, 120, 140, 142, 144 of the magnet arrangement 100. In particular, a magnetization 215 of the first drive magnet 210 of the further magnet arrangement 200 points from a coil-facing side 203 of the further magnet arrangement 200 in the direction of a coil-averted side 204 of the further magnet arrangement 200, and a magnetization 225 of the second drive magnet 220 of the further magnet arrangement 200 points from the coil-averted side 204 in the direction of the coil-facing side 203 of the further magnet arrangement 200.

As in the case of the magnet arrangement 100, the compensation magnets 230, 250 of the further magnet arrangement 200 are magnetized in each case parallel to the path 2 such that their magnetization is directed from that adjacent drive magnet which is magnetized in the direction of the coil-averted side 204 of the magnet arrangement to that adjacent drive magnet which is magnetized in the direction of the coil-facing side 203. It is thus the case in particular that the compensation magnet 230 of the further magnet arrangement 200 has a magnetization 235 which is oriented parallel to the path 2 and which is directed from the first drive magnet 210 in the direction of the second drive magnet 220 of the further magnet arrangement 200.

The electric motor 1 has in each case one gap 3 between the coil-facing sides 103, 203 of the magnet arrangements 100, 200 and the stator 30. In the section plane 106, the width of the gap 3 perpendicular to the path 2 corresponds to the spacing between the face surfaces of the pole teeth 22 and the coil-facing sides 103, 203 of the magnet arrangements 100, 200.

The magnet arrangements 100, 200 comprise in each case one cover 105, which covers enclose the magnets of the magnet arrangements 100, 200. In particular, the covers 105 cover in each case the coil-facing side surfaces of the drive magnets 110, 120, 140, 142, 144, 210, 220, 240 of the magnet arrangements 100, 200, that is to say in particular the side surfaces 111, 121. Those parts of the covers 105 which are situated between the magnet arrangements 100, 200 and the stator 30 fill in each case a part of the gaps 3. The respective parts of the covers 105 may have a thickness of greater than 0.1 mm, in particular a thickness of greater than 0.2 mm, in the direction perpendicular to the path 2.

The covers 105 are composed of a non-magnetic material, for example of a non-magnetic high-grade steel, of aluminum or of a plastic. The magnets of the magnet arrangements 100, 200 are protected against external mechanical action and fouling by the covers 105.

In the electric motor 1, the magnetic resistance to which the magnetic field generated on the coil-facing side 103 by the drive magnets 110, 120, 140, 142, 144, 210, 220, 240 is subjected varies in a manner dependent on the relative position between the drive magnets 110, 120, 140, 142, 144, 210, 220, 240 of the first and second magnet arrangements 100, 200 and the pole teeth 22 of the stator 30. As a result of this variation of the magnetic resistance, a position-dependent force is exerted on the mover 10. Said force generates a variable cogging torque in a manner dependent on the position of the mover 10 relative to the stator 30, which cogging torque has to be overcome in the case of a movement of the mover 10 along the stator 30.

The magnitude of the cogging torque is influenced both by the geometry and arrangement of the drive magnets 110, 120, 140, 142, 144, 210, 220, 240 and by the geometry and arrangement of the pole teeth 22. Accordingly, the magnetic resistance in the magnetic circuit of one of the drive magnets 110, 120, 140, 142, 144, 210, 220, 240 is for example at a minimum when the respective drive magnet 110, 120, 140, 142, 144, 210, 220, 240 is oriented in a centered manner relative to one of the pole teeth 22. Analogously, the magnetic resistance in the magnetic circuit of one of the drive magnets 110, 120, 140, 142, 144, 210, 220, 240 is at a maximum when the respective drive magnet 110, 120, 140, 142, 144, 210, 220, 240 is centered between two of the pole teeth 22.

The action exerted by the pole teeth 22 on one of the drive magnets 110, 120, 140, 142, 144, 210, 220, 240 can be compensated by the action exerted by the pole teeth 22 on another of the drive magnets 110, 120, 140, 142, 144, 210, 220, 240. This is the case for example if, in a position of the mover 10 relative to the stator 30 in which the magnetic resistance in the magnetic circuit of one of the drive magnets 110, 120, 140, 142, 144, 210, 220, 240 is at a minimum, the magnetic resistance in the magnetic circuit of another of the drive magnets 110, 120, 140, 142, 144, 210, 220, 240 is presently at a maximum. On the other hand, the action of the pole teeth 22 on the drive magnets 110, 120, 140, 142, 144, 210, 220, 240 is intensified if two or more of the drive magnets 110, 120, 140, 142, 144, 210, 220, 240 assume the same relative position relative to the pole teeth 22. It is thus for example the case that a particularly high cogging torque arises if two or more of the drive magnets 110, 120, 140, 142, 144, 210, 220, 240 are centered in each case over one of the pole teeth 22.

In the electric motor 1, a pole tooth width 26, which denotes the width of the pole teeth 22 parallel to the path 2, is dimensioned to be of such a size that no magnetic saturation, or only low magnetic saturation, of the material of the pole teeth 22 occurs during the operation of the electric motor 1. At the same time, the pole tooth width 26 along the path 2 is smaller than the respectively coil-facing widths of the drive magnets 110, 120, 140, 142, 144 of the magnet arrangements 100 and of the drive magnets 210, 220, 240 of the further magnet arrangement 200. The pole tooth width 26 of the pole teeth 22 along the path 2 is thus smaller than the coil-facing width 113 of the first cross-sectional area 112 and the coil-facing width 123 of the second cross-sectional area 122. In particular, the width of the drive magnets 110, 120, 140, 142, 144 along the path 2 on the coil-facing side 103 does not correspond to the pole tooth width 26 of the pole teeth 22.

The drive magnets 110, 120, 140, 142, 144, 210, 220, 240 of the magnet arrangements 100, 200 are arranged so as to be spaced apart from one another along the path 2 in each case by a magnet spacing 101. The magnet spacing 101 corresponds to the sum of the coil-facing width 113 of the first cross-sectional area 112 of the first drive magnet 110 and the coil-facing width 133 of the third cross-sectional area 132 of the compensation magnet 130. The pole teeth 22 of the electric motor 1 are arranged so as to be spaced apart from one another uniformly along the path 2 by a pole spacing 25. The pole spacing 25 thus denotes in each case the spacing between one of the coil teeth 23 and an adjacent intermediate tooth 24.

In the electric motor 1, five times the magnet spacing 101 corresponds to 6 times the pole spacing 25. This is illustrated in FIG. 5 by means of additional drive magnets and additional compensation magnets, which are illustrated in each case by dashed lines and which are not encompassed by the magnet arrangements 100, 200.

Since the highest common denominator of the pole spacing 25 and of the magnet spacing 101 is equal to one, there is no position of the mover 10 along the stator 30 in which two or more of the drive magnets 110, 120, 140, 142, 144 have the same relative position with respect to the pole teeth 22. It is thus the case in every position of the mover 10 that the relative positions of the drive magnets 110, 120, 140, 142, 144 with respect to the pole teeth 22 differ from one another. In particular, in the position of the mover 10 illustrated in FIG. 5, other than the first drive magnet 110, no other one of the drive magnets 120, 140, 142, 144 of the first magnet arrangement 100 is oriented in a centered manner relative to one of the pole teeth 22 of the stator 30. This also applies analogously to the drive magnets 210, 220, 250 of the further magnet arrangement 200.

Furthermore, in the electric motor 1, the width of the drive magnets 110, 120, 140, 142, 144 and the width of the face surfaces of the pole teeth 22 along the path 2, and the length ratio between the magnet spacing 101 and the pole spacing 25, are such that, in all positions of the mover 10 along the stator 30, it is the case in each case only at one of the drive magnets 110, 120, 140, 142, 144 of the magnet arrangement 100 that an edge, oriented perpendicular to the section plane 106, of the side surface of the corresponding drive magnet 110, 120, 140, 142, 144 is in flush alignment with an edge, oriented perpendicular to the section plane 106, of the face surface of the pole teeth 22. This minimizes the cogging torques that arise in the case of a movement of the mover 10 along the stator 30.

The coil-facing width of the drive magnets 110, 120, 140, 142, 144 parallel to the path 2, that is to say in particular the coil-facing widths 113, 123 of the cross-sectional areas 112, 122 of the drive magnets 110, 120 may for example amount to 7.8 mm. The spacing between the drive magnets 110, 120, 140, 142, 144, that is to say the coil-facing width of the compensation magnets 130, 150, 152, 154, in particular the coil-facing width 133 of the cross-sectional area 132 of the compensation magnet 130, may for example amount to 2.2 mm, while the height of the side surfaces 111, 121, 131 and the height of the drive and compensation magnets 110, 120, 130, 140, 142, 144, 150, 152, 154 of the magnet arrangement 100 may for example amount to 17 mm. The width of the face surfaces of the pole teeth 22 along the path 2 may for example amount to 4 mm, and the height thereof perpendicular to the section plane 106 may for example amount to 17 mm. In such a case, the magnet spacing 101 of the electric motor 1 amounts to 10 mm, and the pole spacing 25 amounts to 8.33 mm.

In alternative embodiments of the electric motor 1, low cogging torques may also be achieved with a different length ratio of pole spacing 25 and magnet spacing 101, as long as the highest common denominator thereof is equal to one. If a magnet arrangement of the electric motor 1 comprises an overall number M of drive magnets, then at the same time, a high transmission of force to the mover 10 is always achieved if (M+1) times the pole spacing 25 corresponds to M times the magnet spacing 101.

Figure 6:
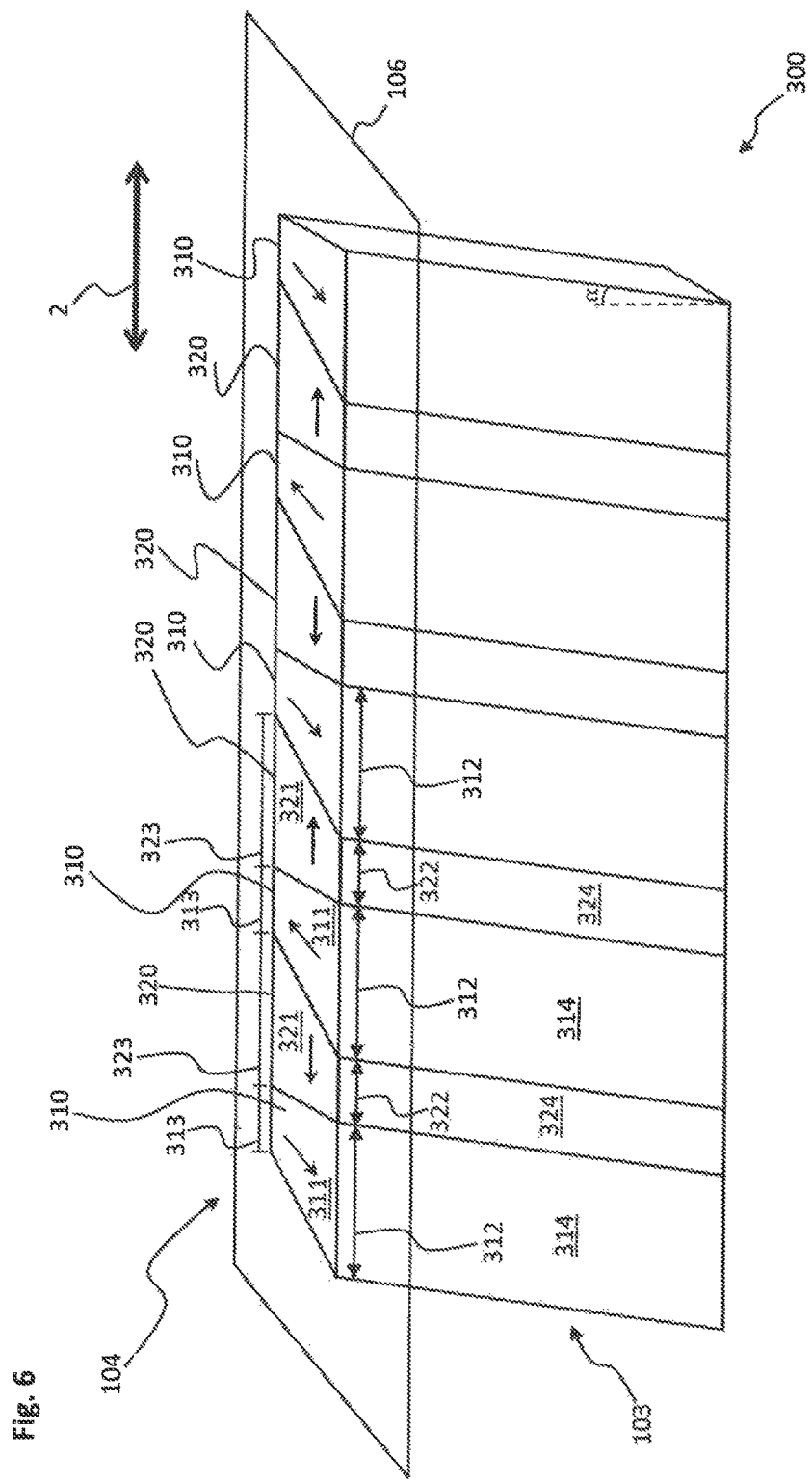
FIG. 6 shows a perspective view of a first alternative magnet arrangement for the mover of the electric motor.

FIG. 6 shows a schematic illustration of a perspective view of a first alternative magnet arrangement 300 for the mover 10 of the electric motor 1. Where no differences are described below, the first alternative magnet arrangement 300 is designed in the same way as the magnet arrangement 100. The first alternative magnet arrangement 300 comprises five drive magnets 310 arranged along the path 2 and four compensation magnets 320 arranged in each case between the drive magnets 310.

Where no differences are described below, the drive magnets 310 and the compensation magnets 320 are designed in the same way as the drive magnets 110, 120, 140, 142, 144 and the compensation magnets 130, 150, 152, 154 respectively of the magnet arrangement 100. In particular, where no differences are described, the drive magnets 310 and the compensation magnets 320 have the same shapes, dimensions and magnetizations as the corresponding drive magnets 110, 120, 140, 142, 144 and the corresponding compensation magnets 130, 150, 152, 154 respectively of the magnet arrangement 100.

As in the case of the magnet arrangement 100, in the section plane 106 along the coil axes of the drive coils 20, the drive magnets 310 each have cross-sectional areas 311 and the compensation magnets 320 each have cross-sectional areas 321, which are each configured as isosceles trapezoids with identical dimensions, that is to say in particular have the same surface area. A coil-facing width 312 of the cross-sectional areas 311 of the drive magnets 310 is greater than a coil-facing width 322 of the cross-sectional areas 321 of the compensation magnets 320. The cross-sectional areas 311 of the drive magnets 310 narrow from the coil-facing side 103 in the direction of the coil-averted side 104, such that the coil-facing width 312 of the cross-sectional areas 311 is greater than the coil-averted widths 313 of the cross-sectional areas 311 on the coil-averted side 104. The cross-sectional areas 321 of the compensation magnets 320 widen from the coil-facing side 103 in the direction of the coil-averted side 104, such that the coil-facing width 322 of the cross-sectional areas 321 is greater than the coil-averted widths 323 of the cross-sectional areas 321 on the coil-averted side 104.

As in the first magnet arrangement 100, it is the case in the first alternative magnet arrangement 300 that the cross-sectional areas 321 of the compensation magnets 320 undercut the cross-sectional areas 311 of the drive magnets 310 on the coil-averted side 104.

By contrast to the drive and compensation magnets 110, 120, 130, 140, 142, 144, 150, 152, 154 of the magnet arrangement 100, the drive magnets 310 and the compensation magnets 320 of the first alternative magnet arrangement 300 are configured not as vertical or straight cylinders but as oblique cylinders. In this way, the cylinder axis of the magnets 310, 320 is not perpendicular to the base surface, which corresponds to the cross-sectional areas 311, 321, of the magnets 310, 320 but is tilted along the path 2 by an angle α. Consequently, by contrast to the situation in the magnet arrangement 100, coil-facing side surfaces 314 of the drive magnets 310 and coil-facing side surfaces 324 of the compensation magnets 320 are not of rectangular configuration but are configured as parallelograms. The tilting of the drive magnets 310 and of the compensation magnets 320 of the first alternative magnet arrangement 300 by the angle α has the result that none of the edges of the side surfaces 314 of the first alternative magnet arrangement is oriented perpendicular to the section plane 106 and thus parallel to an edge, oriented perpendicular to the section plane 106, of the face surfaces, which are exposed at the stator housing 32 of the stator 30, of the pole teeth 22.

Figure 7:
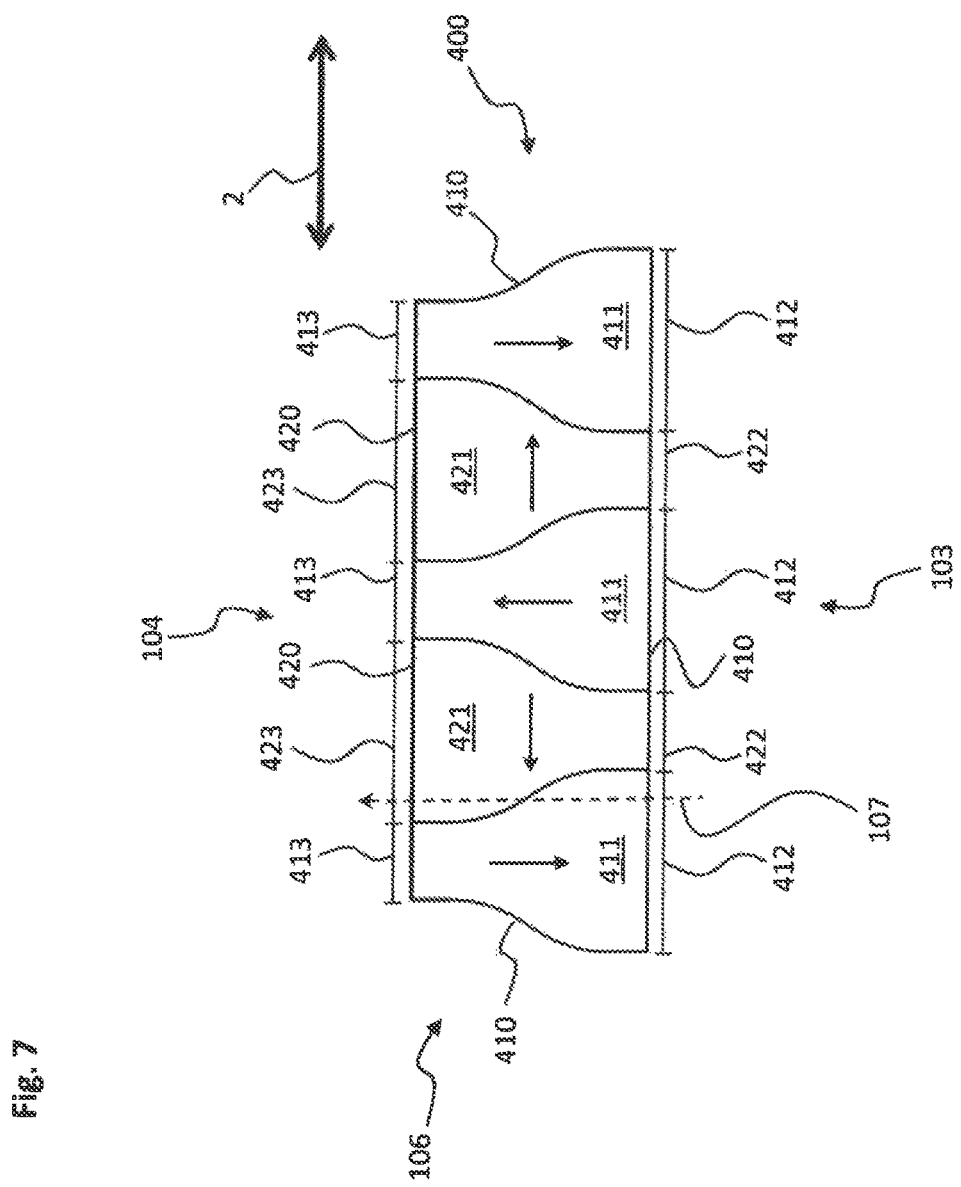
FIG. 7 shows a plan view, sectioned in the section plane, of a second alternative magnet arrangement for the mover of the electric motor.

FIG. 7 shows a schematic illustration of a plan view, sectioned in the section plane 106, of a second alternative magnet arrangement 400 for the mover 10 of the electric motor 1. Where no differences are described below, the second alternative magnet arrangement 400 is designed in the same way as the magnet arrangement 100 or the first alternative magnet arrangement 300.

The second alternative magnet arrangement 400 has three drive magnets 410 arranged along the path 2 and two compensation magnets 420 which are arranged in each case between the drive magnets 410, and so as to adjoin the drive magnets 410, along the path 2. Where no differences are described below, the drive magnets 410 and the compensation magnets 420 are designed in the same way as the drive magnets 110, 120, 140 and the compensation magnets 130, 150 respectively of the magnet arrangement 100 or the drive magnets 310 and the compensation magnets 320 respectively of the first alternative magnet arrangement 300.

By contrast to the drive magnets 110, 120, 140, 310 of the magnet arrangements 100, 300, the drive magnets 410 of the second alternative magnet arrangement 400 do not have trapezoidal cross-sectional areas in the section plane 106 illustrated in FIG. 7. Instead, the drive magnets 410 have cross-sectional areas 411 which narrow in bottle-shaped fashion from the coil-facing side 103 of the second alternative magnet arrangement 400 in the direction of the coil-averted side 104 of the second alternative magnet arrangement 400.

The cross-sectional areas 411 of the drive magnets 410 have two edges running parallel to the path 2 at the coil-facing side 103 and at the coil-averted side 104. Here, the cross-sectional areas 411 on the coil-facing side 103 have a coil-facing width 412 which is greater than a coil-averted width 413 on the coil-averted side 104. The cross-sectional areas 411 of the drive magnets 410 are of symmetrical configuration with respect to a central axis, running in the section plane 106 perpendicular to the path 2, of the cross-sectional areas 411.

The compensation magnets 420 of the second alternative magnet arrangement 400 each have, in the section plane 106, a cross-sectional area 421, the shape and dimensions of which correspond to the shape and the dimensions of the cross-sectional areas 411 of the drive magnets 410, but rotated through one hundred and eighty degrees relative to the cross-sectional areas 411 of the drive magnets 410. Thus, the cross-sectional areas 421 of the compensation magnets 420 and the cross-sectional areas 411 of the drive magnets 410 each have the same surface area, that is to say are of the same size.

Like the cross-sectional areas 411 of the drive magnets 410, the cross-sectional areas 421 of the compensation magnets 420 likewise have two edges running in each case parallel to the path 2 at the coil-facing side 103 and at the coil-averted side 104. By contrast to the cross-sectional areas 411, it is however the case that the cross-sectional areas 421 of the compensation magnets 420 widen in bottle-shaped fashion from the coil-facing side 103 in the direction of the coil-averted side 104. Thus, on the coil-facing side 103, a coil-facing width 422 of the cross-sectional area 421 of the compensation magnets 420 is greater than a coil-averted width 423 of the cross-sectional area 421 of the compensation magnets 420 on the coil-averted side 104.

As in the case of the magnet arrangements 100, 300, the coil-facing width 412 of the cross-sectional areas 411 of the drive magnets 410 is wider than the coil-facing width 422 of the cross-sectional areas 421 of the compensation magnets 420. Furthermore, the coil-facing width 422 of the cross-sectional areas 421 of the compensation magnets 420 corresponds to the coil-averted width 413 of the cross-sectional areas 411 of the drive magnets 410 of the second alternative magnet arrangement 400. The coil-facing width 412 of the cross-sectional areas 411 of the drive magnets 410 corresponds to the coil-averted width 423 of the cross-sectional areas 421 of the compensation magnets 420 of the second alternative magnet arrangement 400.

Figure 8:
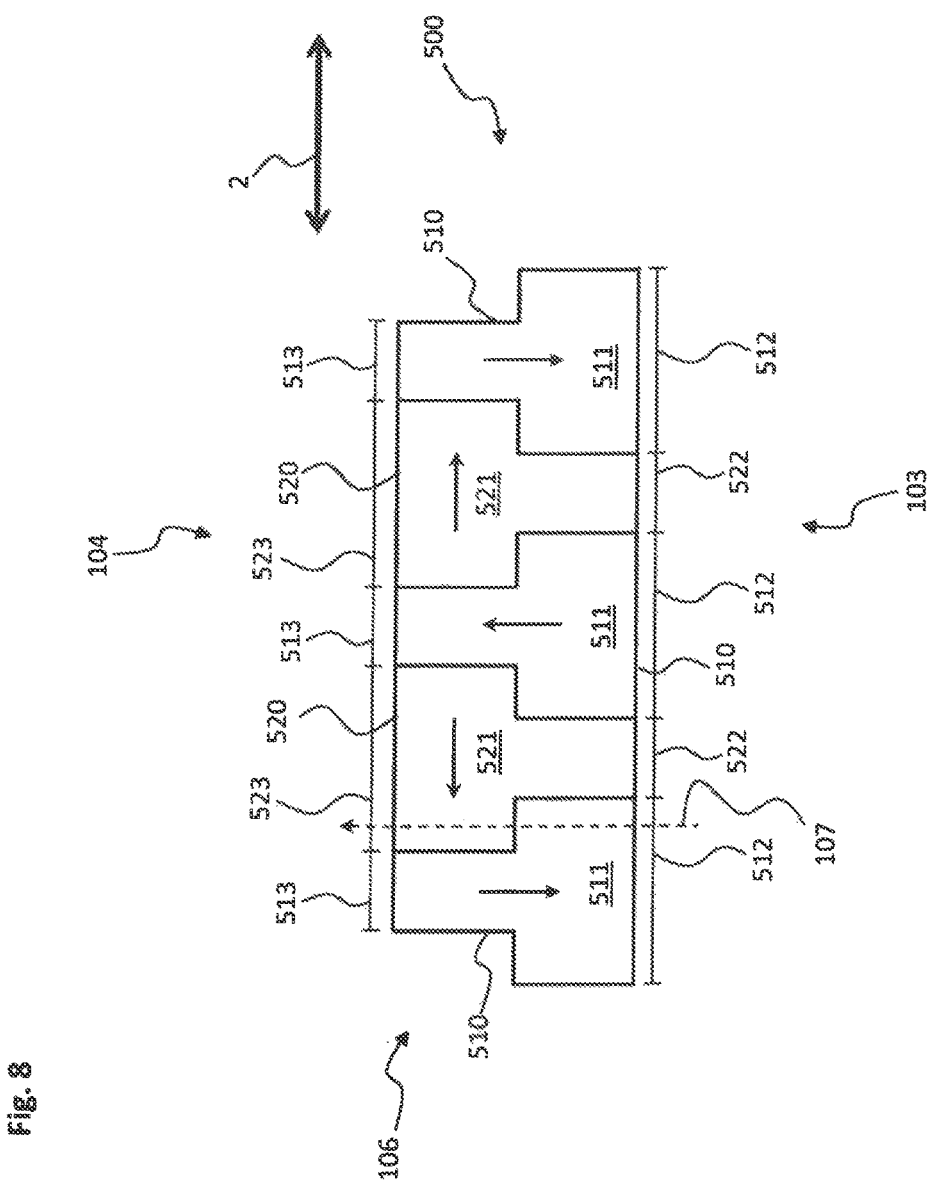
FIG. 8 shows a plan view, sectioned in the section plane, of a third alternative magnet arrangement for the mover of the electric motor.

FIG. 8 shows a schematic illustration of a plan view, sectioned in the section plane 106, of a third alternative magnet arrangement 500 for the mover of the electric motor 1. Where no differences are described below, the third alternative magnet arrangement 500 is designed in the same way as the magnet arrangement 100, the first alternative magnet arrangement 300 or the second alternative magnet arrangement 400.

The third alternative magnet arrangement 500 has three drive magnets 510 arranged along the path 2, and two compensation magnets 520 which are arranged in each case between the drive magnets 510, and so as to adjoin the drive magnets 510, along the path 2. Where no differences are described below, the drive magnets 510 and the compensation magnets 520 are designed in the same way as the drive magnets 110, 120, 140 and the compensation magnets 130, 150 respectively of the magnet arrangement 100, the drive magnets 310 and the compensation magnets 320 respectively of the first alternative magnet arrangement 300, or the drive magnets 410 and the compensation magnets 420 respectively of the second alternative magnet arrangement 400.

In the section plane 106 illustrated in FIG. 8, the drive magnets 510 of the third alternative magnet arrangement 500 each have a cross-sectional area 511 which is of T-shaped configuration and which narrows in step fashion from the coil-facing side 103 of the third alternative magnet arrangement 500 in the direction of the coil-averted side 104 of the third alternative magnet arrangement 500. The cross-sectional areas 511 of the drive magnets 510 have in each case two edges which are parallel to the path 2 and which are arranged on the coil-facing side 103 and on the coil-averted side 104. Here, the cross-sectional area 511 has, on the coil-facing side 103, a coil-facing width 512 which is greater than a coil-averted width 513 on the coil-averted side 104.

Centrally between the edges on the coil-facing side 103 and the edges on the coil-averted side 104, the cross-sectional areas have, at the stepped narrowing, two further edges which run parallel to the edges at the coil-facing side 103 and at the coil-averted side 104. The cross-sectional areas 511 of the drive magnets 510 are of symmetrical configuration with respect to a central axis, running in the section plane 106 and perpendicular to the path 2, of the cross-sectional areas 511.

The compensation magnets 520 of the third alternative magnet arrangement 500 each have, in the section plane 106, a cross-sectional area 521, the shape and dimensions of which correspond to the shape and the dimensions of the cross-sectional areas 511 of the drive magnets 510, but rotated through one hundred and eighty degrees relative to the cross-sectional areas 511 of the drive magnets 510. Thus, the cross-sectional areas 511 of the drive magnets 510 and the cross-sectional areas 521 of the compensation magnets 520 each have the same surface area, that is to say are of the same size.

The cross-sectional areas 521 of the compensation magnets 520 are, like the cross-sectional areas 511 of the drive magnets 510, of T-shaped configuration and symmetrical with respect to a central axis, running transversely with respect to the path 2, of the cross-sectional areas 521, and have edges running in each case parallel to the path 2 at the coil-facing side 103 and at the coil-averted side 104. By contrast to the cross-sectional areas 511 of the drive magnets 510, however, the cross-sectional areas 521 of the compensation magnets 520 widen in step fashion from the coil-facing side 103 in the direction of the coil-averted side 104. Thus, a coil-facing width 522 of the cross-sectional areas 521 of the compensation magnets 520 is narrower than a coil-averted width 523 of the cross-sectional areas 521 of the compensation magnets 520.

As in the magnet arrangements 100, 300, 400, the coil-facing width 512 of the cross-sectional areas 511 of the drive magnets 510 is wider than the coil-facing width 522 of the cross-sectional areas 521 of the compensation magnets 520. Furthermore, the coil-facing width 522 of the cross-sectional areas 521 of the compensation magnets 520 corresponds to the coil-averted width 513 of the cross-sectional areas 511 of the drive magnets 510. The coil-facing width 512 of the cross-sectional areas 511 of the drive magnets 510 corresponds to the coil-averted width 523 of the cross-sectional areas 521 of the compensation magnets 520.

FIG. 9 shows a schematic illustration of a plan view, sectioned in the section plane 106, of a fourth alternative magnet arrangement 600 for the mover of the electric motor 1. Where no differences are described below, the fourth alternative magnet arrangement 600 is designed in the same way as the magnet arrangement 100, the first alternative magnet arrangement 300, the second alternative magnet arrangement 400 or the third alternative magnet arrangement 500.

The fourth alternative magnet arrangement 600 has three drive magnets 610 arranged along the path 2, and two compensation magnets 620 which are arranged in each case between the drive magnets 610, and so as to adjoin the drive magnets 610, along the path 2. Where no differences are described below, the drive magnets 610 and the compensation magnets 620 are designed in the same way as the drive magnets 110, 120, 140 and the compensation magnets 130, 150 respectively of the magnet arrangement 100, the drive magnets 310 and the compensation magnets 320 respectively of the first alternative magnet arrangement 300, or the drive magnets 410, the compensation magnets 420 respectively of the second alternative magnet arrangement 400, or the drive magnets 510 and compensation magnets 520 of the third alternative magnet arrangement 500.

In the section plane 106 illustrated in FIG. 9, the drive magnets 610 of the fourth alternative magnet arrangement 600 each have cross-sectional areas 611 configured as right-angled trapezoids. Here, the two parallel edges of the cross-sectional areas 611 configured as right-angled trapezoids are oriented parallel to the path 2 and are situated in each case on the coil-facing side 103 and on the coil-averted side 104 of the fourth alternative magnet arrangement 600. The cross-sectional areas 610 of the drive magnets thus extend between the coil-facing side 103 and the coil-averted side 104 of the magnet arrangement 600. The cross-sectional areas 611 of the drive magnets 610 narrow from the coil-facing side 103 in the direction of the coil-averted side 104, such that a coil-facing width 612 of the cross-sectional areas 611 is greater than a coil-averted width 613 of the cross-sectional areas 611.

The compensation magnets 620 each have, in the section plane 106, a cross-sectional area 621, the shape and dimensions of which correspond to the shape and the dimensions of the cross-sectional areas 611 of the drive magnets 610, but rotated through one hundred and eighty degrees relative to the cross-sectional areas 611 of the drive magnets 610. Consequently, the cross-sectional areas 621 of the compensation magnets 620 likewise have the shape of a right-angled trapezoid, and have in particular the same surface area as the cross-sectional areas 611 of the drive magnets 610. The cross-sectional areas 621 of the drive magnets 610 and the cross-sectional areas 621 of the compensation magnets 620 are thus of the same size.

Like the cross-sectional areas 611 of the drive magnets 610, the cross-sectional areas 621 of the compensation magnets 620 likewise have two edges running parallel to the path 2 at the coil-facing side 103 and at the coil-averted side 104. However, by contrast to the cross-sectional areas 611 of the drive magnets 610, the cross-sectional areas 621 of the compensation magnets 620 widen from the coil-facing side 103 in the direction of the coil-averted side 104. Thus, a coil-facing width 622 of the cross-sectional areas 621 of the compensation magnets 620 is narrower than a coil-averted width 623 of the cross-sectional areas 621 of the compensation magnets 620.

As in the magnet arrangements 100, 300, 400, 500 the coil-facing width 612 of the cross-sectional areas 611 of the drive magnets 610 is wider than the coil-facing width 622 of the cross-sectional areas 621 of the compensation magnets 620. Furthermore, the coil-facing width 622 of the cross-sectional areas 621 of the compensation magnets 620 corresponds to the coil-averted width 613 of the cross-sectional areas 611 of the drive magnets 610. The coil-facing width 613 of the cross-sectional areas 611 of the drive magnets 610 corresponds to the coil-averted width 623 of the cross-sectional areas 621 of the compensation magnets 620.

In the alternative magnet arrangements 400, 500, 600, in the transverse direction 107, the cross-sectional areas 421, 521, 621 of the compensation magnets 420, 520, 620 in each case undercut the cross-sectional areas 411, 511, 611 of the drive magnets 410, 510, 610 on the coil-averted side 104 of the alternative magnet arrangements 400, 500, 600. Consequently, in regions in which the drive magnets 410, 510, 610 and the compensation magnets 420, 520, 620 adjoin one another, parts of the cross-sectional areas 421, 521, 621 of the compensation magnets 420, 520, 620 which are situated in the direction of the coil-averted side 104 are situated behind parts of the cross-sectional areas 411, 511, 611 of the drive magnets 410, 510, 610 which are situated in the direction of the coil-facing side 103. In the alternative magnet arrangements 400, 500, 600, parts of the edges of the cross-sectional areas 411, 511, 611 of the drive magnets 410, 510, 610 which run parallel to the path 2 on the coil-facing side 103 are situated in the transverse direction 107 in front of parts of the edges of the cross-sectional areas 421, 521, 621 of the compensation magnets 420, 520, 620 which run parallel to the path 2 on the coil-averted side 104.

Whereas it is the case in the second and third alternative magnet arrangements 400, 500 that the cross-sectional areas 411, 511 of the drive magnets 410, 510 are undercut by the cross-sectional areas 421, 521 of the compensation magnets 420, 520 on both transverse sides running between the coil-facing side 103 and the coil-averted side 104, it is the case in the fourth alternative magnet arrangement 600 that the cross-sectional areas 611 of the drive magnets 610 are undercut by the cross-sectional areas 621 of the compensation magnets 620 only on one transverse side running between the coil-facing side 103 and the coil-averted side 104.

Like the drive magnets 110, 120, 140 of the first magnet arrangement 100 and the drive magnets 310 of the first alternative magnet arrangement 300, the drive magnets 410 of the second alternative magnet arrangement 400, the drive magnets 510 of the third alternative magnet arrangement 500 and the drive magnets 610 of the fourth alternative magnet arrangement 600 each have, in the cross-sectional areas 411, 511, 611, a magnetization oriented perpendicular to the path 2, as illustrated in each case by arrows in FIGS. 7, 8 and 9.

The magnetizations of adjacent drive magnets 410, 510, 610 are in this case oriented oppositely to one another, such that the drive magnets 410, 510, 610 of the magnet arrangements 400, 500, 600, like the drive magnets 110, 120, 140, 310 of the magnet arrangements 100, 300, are in each case magnetized alternately in the direction of the coil-facing side 103 and in the direction of the coil-averted side 104.

Like the compensation magnets 130, 150 of the first magnet arrangement 100 and the compensation magnets 320 of the first alternative magnet arrangement 300, it is the case that the compensation magnets 420 of the second alternative magnet arrangement 400, the compensation magnets 520 of the third alternative magnet arrangement 500 and the compensation magnets 620 of the fourth alternative magnet arrangement 600 each have, in the cross-sectional areas 421, 521, 621, a magnetization which is oriented parallel to the path 2 and which is directed in each case from a drive magnet 410, 510, 610 which is magnetized in the direction of the coil-averted side 104 to a drive magnet 410, 510, 610 which is magnetized in the direction of the coil-facing side 103. The directions of the magnetizations of the compensation magnets 420, 520, 620 are likewise illustrated by arrows in FIGS. 7, 8 and 9.

As described in conjunction with FIG. 3 for the magnet arrangement 100, it is the case in the magnet arrangements 400, 500, 600 that the coil-facing widths 412, 512, 612 of the drive magnets 410, 510, 610 and the coil-facing widths 422, 522, 622 of the compensation magnets 420, 520, 620 are in each case of such a size that as great as possible a transmission of force to the mover 10 is achieved and, at the same time, the lowest possible cogging torques arise in the case of a movement of the mover 10 along the stator 30. In particular, the coil-facing widths 412, 512, 612 of the drive magnets 410, 510, 610 and the coil-facing widths 422, 522, 622 of the compensation magnets 420, 520, 620 may be such that, in the case of a number M of drive magnets 410, 510, 610, M times the magnet spacing corresponds to (M+1) times the pole spacing 25 of the electric motor 1. For example, the magnet arrangements 400, 500, 600 may altogether comprise in each case five of the drive magnets 410, 510, 610, and five times the magnet spacing 101 may correspond to 6 times the pole spacing 25, as shown for the magnet arrangement 100 in FIG. 3.

In embodiments of the electric motor 1 in which the mover 10 comprises one of the alternative magnet arrangements 300, 400, 500, 600, the mover 10 may comprise a further magnet arrangement which, like the further magnet arrangement 200 illustrated in FIG. 5, the first alternative magnet arrangement 300, the second alternative magnet arrangement 400, the third alternative magnet arrangement 500 and the fourth alternative magnet arrangement 600, is arranged oppositely on the other side of the stator 30.

The drive magnets 410 and compensation magnets 420 of the second alternative magnet arrangement 400, the drive magnets 510 and compensation magnets 520 of the third alternative magnet arrangement 500 and the drive magnets 610 and compensation magnets 620 of the fourth alternative magnet arrangement 600 may, like the drive magnets 110, 120, 140 and the compensation magnets 130, 150 of the magnet arrangement 100, be configured as straight cylinders. In this case, the drive magnets 410, 510, 610 and compensation magnets 420, 520, 620 each have rectangular side surfaces on the coil-facing side 103, as is illustrated in the perspective view of FIG. 4 for the magnet arrangement 100.

The drive magnets 410, 510, 610 and the compensation magnets 420, 520, 620 may also, like the drive magnets 310 and the compensation magnets 320 of the first alternative magnet arrangement 300, be configured as oblique cylinders tilted by the angle α. Then, the drive magnets 410, 510, 610 and the compensation magnets 420, 520, 620 each have side surfaces configured as parallelograms, as illustrated for the first alternative magnet arrangement 300 in FIG. 6.

In the magnet arrangements 100, 300, 400, 500, 600, the cross-sectional areas 112, 122, 132, 311, 321, 411, 421, 511, 421, 611, 621 extend in each case between the coil-facing side 103 and the coil-averted side 104 of the magnet arrangements 100, 300, 400, 500, 600. On the coil-facing side 103 and on the coil-averted side 104, the cross-sectional areas 112, 122, 132, 311, 321, 411, 421, 511, 521, 611, 621 each have edges which are oriented parallel to the path 2.

On the coil-facing side 103, the coil-facing widths 113, 123, 312, 412, 512, 612 of the cross-sectional areas 112, 122, 311, 411, 511, 611 of the drive magnets 110, 120, 140, 142, 144, 310, 410, 510, 610 are in each case greater than the coil-facing widths 133, 322, 422, 522, 622 of the cross-sectional areas 132, 321, 421, 521, 621 of the compensation magnets 130, 150, 152, 154, 320, 420, 520, 620.

In the magnet arrangements 100, 300, 400, 500, 600, the drive magnets 110, 120, 140, 142, 144, 310, 410, 510, 610 are in each case wider on the coil-facing side 103 than on the coil-averted side 104. The coil-facing width 113, 123, 312, 412, 512, 612 of the cross-sectional areas 112, 122, 311, 411, 511, 611 of the drive magnets 110, 120, 140, 142, 144, 310, 410, 510, 610 is thus greater than the coil-averted width 114, 124, 313, 413, 513, 613 of the cross-sectional areas 112, 122, 311, 411, 511, 611 of the drive magnets 110, 120, 140, 142, 144, 310, 410, 510, 610 on the coil-averted side 104.

In the magnet arrangements 100, 300, 400, 500, 600, the compensation magnets 130, 150, 152, 154, 320, 420, 520, 620 are in each case narrower on the coil-facing side 103 than on the coil-averted side 104. The coil-facing width 133, 322, 422, 522, 622 of the cross-sectional areas 132, 321, 421, 521, 621 of the compensation magnets 130, 150, 152, 154, 320, 420, 520, 620 is thus smaller than the coil-averted width 134, 323, 423, 523, 623 of the cross-sectional areas 132, 321, 421, 521, 621 of the compensation magnets 130, 150, 152, 154, 320, 420, 520, 620 on the coil-averted side 104.

In the magnet arrangements 100, 300, 400, 500, 600, the coil-facing width 113, 123, 312, 412, 512, 612 of the drive magnets 110, 120, 140, 142, 144, 310, 410, 510, 610 corresponds in each case to the coil-averted width 134, 323, 423, 523, 623 of the cross-sectional areas 132, 321, 421, 521, 621 of the compensation magnets 130, 150, 152, 154, 320, 420, 520, 620. In the magnet arrangements 100, 300, 400, 500, 600, the coil-facing width 133, 322, 422, 522, 622 of the cross-sectional areas 132, 321, 421, 521, 621 of the compensation magnets 130, 150, 152, 154, 320, 420, 520, 620 corresponds in each case to the coil-averted width 114, 124, 313, 413, 513, 613 of the cross-sectional areas 112, 122, 311, 411, 511, 611 of the drive magnets 110, 120, 140, 142, 144, 310, 410, 510, 610.

In alternative embodiments of the magnet arrangements 100, 200, 300, 400, 500, 600, in which the cross-sectional areas 132, 321, 421, 521, 621 of the compensation magnets 130, 150, 152, 154, 230, 320, 420, 520, 620 undercut the cross-sectional areas 112, 122, 311, 411, 511, 611 of the drive magnets 110, 120, 140, 142, 144, 310, 410, 510, 610 in the transverse direction 107, the coil-averted widths 114, 124, 313, 413, 513, 613 of the cross-sectional areas 112, 122, 311, 411, 511, 611 of the drive magnets 110, 120, 140, 142, 144, 310, 410, 510, 610 may also be greater than the coil-averted widths 134, 323, 423, 523, 623 of the cross-sectional areas 132, 321, 421, 521, 621 of the compensation magnets 130, 150, 152, 154, 320, 420, 520, 620.

Alternatively or in addition, in such embodiments, the coil-averted widths 114, 124, 313, 413, 513, 613 of the cross-sectional areas 112, 122, 311, 411, 511, 611 of the drive magnets 110, 120, 140, 142, 144, 310, 410, 510, 610 or the coil-averted widths 134, 323, 423, 523, 623 of the cross-sectional areas 132, 321, 421, 521, 621 of the compensation magnets 130, 150, 152, 154, 320, 420, 520, 620 may differ from the coil-facing widths 133, 322, 422, 522, 622 of the cross-sectional areas 132, 321, 421, 521, 621 of the compensation magnets 130, 150, 152, 154, 320, 420, 520, 620 or from the coil-facing widths 113, 123, 312, 412, 512, 612 of the cross-sectional areas 112, 122, 311, 411, 511, 611 of the drive magnets 110, 120, 140, 142, 144, 310, 410, 510, 610 respectively.

In the magnet arrangements 100, 200, 300, 400, 500, 600, the cross-sectional areas 112, 122, 311, 411, 511, 611 of the drive magnets 110, 120, 140, 142, 144, 310, 410, 510, 610 and the cross-sectional areas 132, 321, 421, 521, 621 of the compensation magnets 130, 150, 152, 154, 320, 420, 520, 620 all have the same surface area. In alternative embodiments of the magnet arrangements 100, 200, 300, 400, 500, 600, it is also possible for only the cross-sectional areas of the drive magnets and/or the cross-sectional areas of the compensation magnets to have the same surface area as one another, whereas the surface areas of the cross-sectional areas of the drive magnets differ from the surface areas of the cross-sectional areas of the compensation magnets.

A suitable magnetic material of which the magnets of the magnet arrangements 100, 200, 300, 400, 500, 600 are composed or which the magnets of the magnet arrangements 100, 200, 300, 400, 500, 600 may have is for example neodymium. The magnets of the magnet arrangements 100, 200, 300, 400, 500, 600 may for example be homogeneously magnetized, that is to say the magnetization is oriented substantially in the same direction at all points within the magnets. In particular, the magnets of the magnet arrangements 100, 200, 300, 400, 500, 600 may, in every section plane oriented parallel to the section plane 106, have the magnetization illustrated in FIGS. 3 to 9 over the entire section plane. An angular deviation of the magnetization of the magnets of the magnet arrangements 100, 200, 300, 400, 500, 600 in relation to the magnetization perpendicular or parallel to the path 2, as described in conjunction with FIGS. 3 to 9, may for example amount to less than 15%, in particular less than 5%.

The magnetizations of the drive magnets 110, 120, 140, 142, 144, 310, 410, 510, 610 and of the compensation magnets 130, 150, 152, 154, 320, 420, 520, 620 of the magnet arrangements 100, 300, 400, 500, 600 have in each case the same strength, that is to say the same magnitude, and are thus of the same value. In this case, the fact that the drive magnets 110, 120, 140, 142, 144, 310, 410, 510, 610 and the compensation magnets 130, 150, 152, 154, 320, 420, 520, 620 each have areas of equal size in the section plane 106 has the effect that the magnetic field of the drive magnets 110, 120, 140, 142, 144, 310, 410, 510, 610 is virtually fully attenuated or compensated on the coil-averted side 104 by the magnetic field of the compensation magnets 130, 150, 152, 154, 320, 420, 520, 620, whereas said magnetic field of the drive magnets is greatly intensified on the coil-facing side 104.

Non-illustrated alternative embodiments of a magnet arrangement, in which, in the manner of a Halbach arrangement, compensation magnets which are arranged between drive magnets along the path 2 undercut the drive magnets on the coil-averted side 104, also encompass magnet arrangements in which the drive magnets do not extend as far as the coil-averted side 104 of the magnet arrangement. For example, the compensation magnets may adjoin one another on the coil-averted side 104, and the drive magnets may be arranged in recesses of the compensation magnets, said recesses being arranged on the coil-facing side 103. Here, the cross-sectional areas of the drive magnets and the cross-sectional areas of the compensation magnets may each have different surface areas in the section plane 106.

In likewise non-illustrated alternative embodiments of a magnet arrangement, in which, in a manner of a Halbach arrangement, compensation magnets arranged between drive magnets along the path 2 undercut the drive magnets on the coil-averted side 104, the coil-averted width of the drive magnets may even be shortened to zero, such that the cross-sectional areas of the drive magnets make contact with the coil-averted side 104 of the magnet arrangement only at a point. This may in particular also be the case in the magnet arrangements 100, 200, 300, 400, 500, 600 illustrated in FIGS. 3 to 9. In all of these alternative embodiments, the cross-sectional areas of the drive magnets and the cross-sectional areas of the compensation magnets may have different surface areas in the cross-sectional plane 106.

Also, in alternative embodiments of a magnet arrangement in which, in the manner of a Halbach arrangement, compensation magnets arranged between drive magnets along the path 2 undercut the drive magnets on the coil-averted side 104, the surface areas of the drive magnets and/or the surface areas of the compensation magnets may have sizes which differ from one another, wherein the sizes may differ from one another for example by 20%, in particular by 10%, or else only by 5%.

In a non-illustrated alternative embodiment of a magnet arrangement according to the invention for an electric motor configured as a linear motor, the magnet arrangement is designed to be arranged along a stator of the electric motor. Where no differences are described below, the magnet arrangement is in this case designed in the same way as one of the magnet arrangements 100, 300, 400, 500, 600. To cover the entire length of the stator of the electric motor, the magnet arrangement has a number of additional drive magnets with compensation magnets arranged therebetween.

In such a case, the pole teeth and the drive coils of the electric motor are arranged on a mover which is movable along the stator. The drive coils on the mover are connected via an electrical feedline, or via contacts arranged along the stator, for example via sliding contacts, to an electrical supply device for generating the coil currents which are applied to the drive coils.

In a non-illustrated further alternative embodiment of a magnet arrangement according to the invention, said magnet is designed for being used in a rotary motor rather than in a linear motor. Such a magnet arrangement is of substantially analogous design to the magnet arrangements 100, 200, 400, 500, 600 but, in the direction oriented along the path 2 in the case of the magnet arrangements 100, 300, 400, 500, 600, is curved in circular fashion about an axis of rotation of the electric motor. The drive magnets and the compensation magnets of the magnet arrangement thus each have coil-facing side surfaces which, rather than being oriented in a straight manner along the path 2, are curved around the axis of rotation of the rotary motor. Where the description of the magnet arrangements 100, 200, 300, 400, 500, 600 refers to the path 2, the magnet arrangement for a rotary motor has analogous features which relate in each case not to the straight path 2 but to a circular path around the axis of rotation of the rotary motor.

Such a magnet arrangement for a rotary motor may in particular comprise drive magnets and compensation magnets arranged between the drive magnets along the circular path, which drive magnets and compensation magnets have cross-sectional areas of equal size in a radial cross-sectional plane perpendicular to an axis of rotation of the rotary motor. Regardless of the size of the cross-sectional areas, the cross-sectional areas may for example be configured analogously to one of the shapes of the cross-sectional areas of the magnets of the magnet arrangements 100, 300, 400, 500, 600 as illustrated in FIG. 3, 6, 7, 8 or 9, wherein the edges running on the coil-facing side 103 and on the coil-averted side 104 run parallel to the circular path, that is to say are configured as circular segments which are curved about the axis of rotation. The coil-facing and coil-averted widths of the cross-sectional areas of the drive and compensation magnets then correspond to the arc length of said curved circular segments.

It is also the case in the magnet arrangement for the rotary motor that the coil-facing widths of the drive magnets are greater than the coil-facing widths of the compensation magnets. A magnetization of the compensation magnets is in this case oriented in each case from a drive magnet whose magnetization is directed radially outward in the direction of a drive magnet whose magnetization is directed radially inward.

It is also the case in the magnet arrangement for the rotary motor that the cross-sectional areas of the compensation magnets undercut the cross-sectional areas of the drive magnets on the coil-averted side in a radial direction, which corresponds to the transverse direction 107. Thus, parts of the cross-sectional areas of the compensation magnets which are situated in the direction of the coil-averted side are situated, in the radial direction, behind parts of the drive magnets which are situated in the direction of the coil-facing side.

According to one embodiment, a magnet arrangement for interacting with drive coils of an electric motor comprises a first drive magnet, a second drive magnet and a compensation magnet which are arranged between a coil-facing side of the magnet arrangement and a coil-averted side of the magnet arrangement. The compensation magnet is arranged between the first drive magnet and the second drive magnet. The first drive magnet has a first cross-sectional area, the second drive magnet has a second cross-sectional area and the compensation magnet has a third cross-sectional area. A coil-facing width of the first cross-sectional area and a coil-facing width of the second cross-sectional area is in each case greater than a coil-facing width of the third cross-sectional area. A coil-averted width of the third cross-sectional area is greater than the coil-facing width of the third cross-sectional area, and the third cross-sectional area undercuts the first cross-sectional area and the second cross-sectional area on the coil-averted side.

The compensation magnet may be arranged entirely or partially between the drive magnets in a movement direction of the electric motor. In the case of a linear motor, the movement direction is directed along the path along which the mover of the motor moves. In the case of a rotary motor, the movement direction corresponds to the rotational direction of the motor.

A magnet arrangement in which a coil-facing width of a compensation magnet between a first drive magnet and a second drive magnet is smaller than a coil-facing width of the first and second drive magnet makes it possible for the magnet spacing between the first drive magnet and the second drive magnet to be designed to be smaller than the coil-facing width of the drive magnets. In this way, an optimum interaction of the magnet arrangement with drive coils of the electric motor can be achieved. In particular, the coil-facing width of the first and the second drive magnet, and the spacing between the first and the second drive magnet, can be adapted such that as great and uniform a transmission of force as possible between the drive coils and the magnet arrangement of the electric motor is realized, and at the same time, the lowest possible cogging torques occur during a relative movement of the magnet arrangement with respect to the drive coils of the electric motor. By means of the compensation magnet, the magnet arrangement can generate high magnetic field strengths on its coil-facing side.

The first cross-sectional area, the second cross-sectional area and the third cross-sectional area may lie in a common section plane through the magnet arrangement, which section plane is oriented parallel to coil axes of the drive coils of the electric motor. For example, the coil axes may lie in the section plane.

The electric motor may be a rotary motor, for example a rotary synchronous motor, with a mover which is movable along a curved path. In this case, the section plane may extend in a radial direction and may be oriented perpendicular to the axis of rotation of the electric motor. The first drive magnet, the second drive magnet and the compensation magnet may in this case each be configured as part of a cylindrical shell, wherein the axis of the cylindrical shell coincides with the axis of rotation of the motor.

The electric motor may however also be a linear motor, for example a linear synchronous motor, having a mover which is movable along a straight path. In these cases, the section plane that encompasses the first, second and third cross-sectional areas may be oriented parallel to the path along which the mover is movable.

In the case of a linear motor, the shape of the first drive magnet, of the second drive magnet and of the compensation magnet may correspond in each case to a general cylinder, the base surface of which forms the first, second or third cross-sectional area respectively and the cylinder axis of which is oriented perpendicular to the coil axes of the drive coils. The cylinder may be either a straight or vertical cylinder, in the case of which a cylinder axis is perpendicular to the base surface, though may also be an oblique cylinder, in the case of which the cylinder axis is not oriented perpendicular to the base surface.

Both in the case of a rotary motor and in the case of a linear motor, the coil-facing width of the third cross-sectional area of the compensation magnet, and thus the coil-facing width of the compensation magnet itself, or the spacing between the first drive magnet and the second drive magnet on the coil-facing side, may be configured so as to achieve as great as possible a transmission of force between the stator and mover with the simultaneously lowest possible cogging torques.

In the case of a magnet arrangement in which the third cross-sectional area of the compensation magnet undercuts the first and second cross-sectional areas of the drive magnets on the coil-averted side, parts of the drive magnets which are situated on the coil-facing side are arranged in front of parts of the compensation magnet which are situated between the coil-facing and the coil-averted side in the transverse direction. The transverse direction extends in this case in the section plane with the first, second and third cross-sectional areas from the coil-facing side in the direction of the coil-averted side, and is oriented perpendicular to the movement direction of the magnet arrangement, for example perpendicular to a path along which the mover of the motor is movable. For example, the transverse direction may be oriented parallel to the coil axes of the electric motor.

In other words, a magnet arrangement in which the third cross-sectional area of the compensation magnet undercuts the first and second cross-sectional areas of the drive magnets on the coil-averted side has section planes which are oriented perpendicular to the coil-facing sides of the first and second cross-sectional areas, that is to say for example encompass the coil axes of a linear or rotary motor, and which intersect the first or second cross-sectional area on the coil-facing side of the magnet arrangement and intersect the third cross-sectional area between the coil-facing side and the coil-averted side. Viewed from the coil-facing side in the direction of the coil-averted side, for example in a direction along the coil axes, it is thus the case that, on the coil-facing side, parts of the first and of the second drive magnet conceal parts of the compensation magnet which are situated behind said magnets.

In the case of a magnet arrangement in which the compensation magnet undercuts the drive magnets, the magnetic field of the compensation magnet intensifies the magnetic fields of the drive magnets not only in front of edge regions in which drive magnets and compensation magnet adjoin one another but also in regions in front of the center of the drive magnets. By means of such intensification even in the center of the drive magnets and a suitable adaptation of the coil-averted widths of drive magnets and compensation magnet, it is possible to realize a magnetic field profile in the region of the drive coils in the case of which, aside from edge effects at the ends of the magnet arrangement, the maxima and minima of the magnetic field component parallel to the axes of the drive coils have approximately the same magnitude, and the total magnitude of the generated magnetic field is approximately constant along the drive coils.

In one further embodiment of the magnet arrangement, the first drive magnet has a magnetization which is oriented from the coil-averted side of the magnet arrangement in the direction of the coil-facing side of the magnet arrangement, and the second drive magnet has a magnetization which is oriented from the coil-facing side of the magnet arrangement in the direction of the coil-averted side of the magnet arrangement. The compensation magnet has a magnetization which is oriented from the second drive magnet in the direction of the first drive magnet.

A magnet arrangement with drive magnets and compensation magnet with such magnetization, the magnetic circuit between the first drive magnet and the second drive magnet is, as in the case of a Halbach arrangement, closed by the compensation magnet within the magnet arrangement. Furthermore, the compensation magnet intensifies the magnetic field of the first and of the second drive magnet on the coil-facing side of the magnet arrangement and compensates said magnetic field on the coil-averted side of the magnet arrangement.

In the case of a magnet arrangement configured in this way, the magnitude of the magnetic field is approximately 1.4 times stronger on the coil-facing side than the magnitude of the magnetic field of the first and of the second drive magnet would be without the compensation magnet. The stronger magnetic field makes it possible to exert a greater force on the mover of the motor, or for the spacing between drive coils and drive magnets to be increased for the same transmission of force. A greater spacing between the drive coils and the drive magnets simplifies the manufacture of the motor, and it is for example possible for mechanical guides of the mover to be produced with greater manufacturing tolerances, the demands on the tolerances of the mechanical guide during operation are reduced, and adjustment work during the installation of the electric motor can be performed more easily.

Furthermore, with such magnetization of the magnets of the magnet arrangement, it is possible to dispense with a magnetic return plate on the coil-averted side of the magnet arrangement. In this way, in the case of the magnet arrangement being mounted on the mover of the electric motor, the mover can be designed to be of lighter weight.

In one further embodiment of the magnet arrangement, a coil-averted width of the first cross-sectional area is smaller than the coil-facing width of the first cross-sectional area, and a coil-averted width of the second cross-sectional area is smaller than the coil-facing width of the second cross-sectional area. In other words, the cross-sectional areas of the drive magnets narrow from the coil-facing side in the direction of the coil-averted side. In this way, even in the case of a magnet arrangement in which the compensation magnet undercuts the drive magnets, the drive magnets can extend from the coil-facing side to the coil-averted side of the magnet arrangement, such that the drive magnets have a large cross-sectional area and generate a strong magnetic field.

In one further embodiment of the magnet arrangement, the coil-averted width of the third cross-sectional area of the compensation magnet corresponds to the coil-facing width of the first cross-sectional area of the first drive magnet and to the coil-facing width of the second cross-sectional area of the second drive magnet. The coil-facing width of the third cross-sectional area of the compensation magnet corresponds to the coil-averted width of the first cross-sectional area of the first drive magnet and to the coil-averted width of the second cross-sectional area of the second drive magnet. In this way, the drive magnets and the compensation magnet can be of symmetrical configuration, which facilitates the arrangement of the magnets.

In one further embodiment of the magnet arrangement, the first cross-sectional area, the second cross-sectional area and the third cross-sectional area are each configured as a trapezoid, in particular configured as an isosceles trapezoid. In this way, the compensation magnet can be easily arranged so as to adjoin the drive magnets.

In one further embodiment of the magnet arrangement, the first cross-sectional area, the second cross-sectional area and the third cross-sectional area extend in a section plane through the magnet arrangement in each case between the coil-facing side of the magnet arrangement and the coil-averted side of the magnet arrangement. In this way, both the drive magnets and the compensation magnets can have a large cross-sectional area, such that they each generate a strong magnetic field.

In one further embodiment of the magnet arrangement, the surface area of the first cross-sectional area and the surface area of the second cross-sectional area are of equal size.

In one further embodiment of the magnet arrangement, the surface area of the first cross-sectional area, the surface area of the second cross-sectional area and the surface area of the third cross-sectional area are of equal size. In this way, the magnetic field of the drive magnets is substantially fully compensated by the field of the compensation magnet on the coil-averted side and is intensified to a great extent and in a homogeneous manner on the coil-facing side of the magnet arrangement. In particular, in the case of cross-sectional areas of equal size, the magnetic field of the magnet arrangement can have an approximately constant magnitude along the drive coils, and the magnetic field component perpendicular to the movement direction of the magnet arrangement and along the coil axes can have maxima and minima of approximately equal magnitude.

With regard to the cross-sectional areas, "of equal size" is also intended to encompass size deviations of up to 20% between the cross-sectional areas of the drive magnets and the cross-sectional area of the compensation magnet.

In one further embodiment of the magnet arrangement, a coil-facing side surface of the first drive magnet, a coil-facing side surface of the second drive magnet and a coil-facing side surface of the compensation magnet are of rectangular configuration.

In one further embodiment of the magnet arrangement, the first drive magnet, the second drive magnet and the third drive magnet are arranged so as to adjoin one another. This leads to a great intensification of the magnetic field of the drive magnets on the coil-facing side of the magnet arrangement by means of the compensation magnets.

In one further embodiment of the magnet arrangement, the magnet arrangement is arranged on a carrier device, wherein the carrier device is composed of a non-magnetic material, in particular of aluminum. The non-magnetic material is in this case substantially free from ferromagnetic constituents, and has a relative magnetic permeability of close to one. The carrier device may for example comprise a separate carrier plate. In the case of the magnet arrangement being mounted on the mover of the electric motor, the carrier device may also be formed by a housing of the mover or by the mover itself, for example by a mover body. The carrier device may also be composed not of aluminum but of some other non-magnetic material, for example of a plastic. In all of these cases, the carrier device or the mover may have a low weight.

In one further embodiment of the magnet arrangement, the magnet arrangement has a cover, wherein the cover is arranged on the coil-facing side of the magnet arrangement. In this way, the first and the second drive magnet and the compensation magnet can be protected against external mechanical action and fouling.

A mover for an electric motor comprises a magnet arrangement for interacting with drive coils of the electric motor.

An electric motor comprises a mover which has a magnet arrangement for interacting with drive coils of an electric motor, wherein the drive coils of the electric motor interact, by means of pole teeth which are arranged spaced apart from one another by a pole spacing, with the magnet arrangement of the mover, and wherein the highest common denominator of the pole spacing and of a magnet spacing between the first drive magnet and the second drive magnet of the magnet arrangement is equal to one. In the case of such an electric motor, it is never the case at any time that two or more drive magnets have the same relative position with respect to the drive coils, whereby only low cogging torques arise in the event of a movement of the mover relative to the pole teeth of the drive coils.

In one further embodiment of the electric motor, the magnet arrangement has a number M of drive magnets which are in each case arranged so as to be spaced apart from one another by the magnet spacing. Here, M times the magnet spacing corresponds to an integer multiple of the pole spacing. In the case of such a design of an electric motor, it is possible in a simple manner for a high force to be exerted on the mover of the motor, without two or more drive magnets having the same relative position with respect to the drive coils and thus giving rise to high cogging torques.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

LIST OF REFERENCE DESIGNATIONS

1 Electric motor
2 Path
3 Gap

10 Mover
11 Rollers
12 Mover body
20 Drive coils
21 Coil winding
22 Pole tooth
23 Coil tooth
24 Intermediate tooth
25 Pole spacing
26 Pole tooth width
30 Stator
31 Running rail
32 Stator housing
33 Circuit board
34 Fastening rail
35 Bolts
36 Connecting element
40 Position detection system
42 Encoder lug
44 Receiver board
50 Conventional magnet arrangement
51 Drive magnets of the conventional magnet arrangement
52 Width of the drive magnets
53 Spacing of the drive magnets
54 Carrier device
60 Halbach magnet arrangement
61 Drive magnets
62 Compensation magnets
63 Width of the drive magnets
64 Width of the compensation magnets
100 Magnet arrangement
101 Magnet spacing
102 Carrier device
103 Coil-facing side
104 Coil-averted side
105 Cover
106 Section plane
107 Transverse direction
110 First drive magnet
111 Coil-facing side surface of the first drive magnet
112 First cross-sectional area
113 Coil-facing width of the first cross-sectional area
114 Coil-averted width of the first cross-sectional area
115 Magnetization of the first drive magnet
120 Second drive magnet
121 Coil-facing side surface of the second drive magnet
122 Second cross-sectional area
123 Coil-facing width of the second cross-sectional area
124 Coil-averted width of the second cross-sectional area
125 Magnetization of the first drive magnet
130 Compensation magnet
131 Coil-facing side surface of the compensation magnet
132 Third cross-sectional area
133 Coil-facing width of the third cross-sectional area
134 Coil-averted width of the third cross-sectional area
135 Magnetization of the first drive magnet
140 First further drive magnet
141 Magnetization of the first further drive magnet
142 Second further drive magnet
143 Magnetization of the second further drive magnet
144 Third further drive magnet
145 Magnetization of the third further drive magnet
150 First further compensation magnet
151 Magnetization of the first further compensation magnet
152 Second further compensation magnet
153 Magnetization of the second further compensation magnet
154 Third further compensation magnet
155 Magnetization of the third further compensation magnet
200 Further magnet arrangement
203 Coil-facing side of the further magnet arrangement
204 Coil-averted side of the further magnet arrangement
210 First drive magnet of the further magnet arrangement
215 Magnetization of the first drive magnet of the further magnet arrangement
220 Second drive magnet of the further magnet arrangement
225 Magnetization of the second drive magnet of the further magnet arrangement
230 Compensation magnet of the further magnet arrangement
235 Magnetization of the compensation magnet of the further magnet arrangement
240 Further drive magnet of the further magnet arrangement
250 Further compensation magnets of the further magnet arrangement
300 First alternative magnet arrangement
310 Drive magnets of the first alternative magnet arrangement
311 cross-sectional area of the drive magnets of the first alternative magnet arrangement
312 Coil-facing width
313 Coil-averted width
314 Coil-facing side surface
320 Compensation magnets of the first alternative magnet arrangement
321 cross-sectional area of the compensation magnets of the first alternative magnet arrangement
322 Coil-facing width
323 Coil-averted width
324 Coil-facing side surface
400 Second alternative magnet arrangement
410 Drive magnets of the second alternative magnet arrangement
411 Cross-sectional area of the drive magnets of the second alternative magnet arrangement
412 Coil-facing width
413 Coil-averted width
420 Compensation magnets of the first alternative magnet arrangement
421 Cross-sectional area of the compensation magnets of the second alternative magnet arrangement
422 Coil-facing width
423 Coil-averted width
500 Third alternative magnet arrangement
510 Drive magnets of the third alternative magnet arrangement
511 Cross-sectional area of the drive magnets of the third alternative magnet arrangement
512 Coil-facing width
513 Coil-averted width
520 Compensation magnets of the third alternative magnet arrangement
521 Cross-sectional area of the compensation magnets of the third alternative magnet arrangement
522 Coil-facing width
523 Coil-averted width
600 Fourth alternative magnet arrangement
610 Drive magnets of the fourth alternative magnet arrangement

611 Cross-sectional area of the drive magnets of the fourth alternative magnet arrangement
612 Coil-facing width
613 Coil-averted width
620 Compensation magnets of the fourth alternative magnet arrangement
621 Cross-sectional area of the compensation magnets of the fourth alternative magnet arrangement
622 Coil-facing width
623 Coil-averted width

What is claimed is:

1. A magnet arrangement for interacting with drive coils of an electric motor,
wherein the magnet arrangement comprises at least a first drive magnet, a second drive magnet and a compensation magnet which are arranged between a coil-facing side of the magnet arrangement and a coil-averted side of the magnet arrangement,
wherein the compensation magnet is arranged between the first drive magnet and the second drive magnet,
wherein the first drive magnet has a magnetization which is oriented from the coil-averted side of the magnet arrangement in the direction of the coil-facing side of the magnet arrangement,
wherein the second drive magnet has a magnetization which is oriented from the coil-facing side of the magnet arrangement in the direction of the coil-averted side of the magnet arrangement,
wherein the compensation magnet has a magnetization which is oriented from the second drive magnet in the direction of the first drive magnet,
wherein the first drive magnet has a first cross-sectional area, the second drive magnet has a second cross-sectional area and the compensation magnet has a third cross-sectional area,
wherein the first cross-sectional area, the second cross-sectional area and the third cross-sectional area lie in a common section plane through the magnet arrangement, which section plane is oriented parallel to coil axes of the drive coils,
wherein the first cross-sectional area, the second cross-sectional area and the third cross-sectional area extend in the section plane in each case between the coil-facing side of the magnet arrangement and the coil-averted side of the magnet arrangement,
wherein a coil-averted width of the third cross-sectional area corresponds to a coil-facing width of the first cross-sectional area and to a coil-facing width of the second cross-sectional area,
wherein a coil-facing width of the third cross-sectional area corresponds to a coil-averted width of the first cross-sectional area and to a coil-averted width of the second cross-sectional area,
wherein the coil-averted width of the first cross-sectional area is smaller than the coil-facing width of the first cross-sectional area, and the coil-averted width of the second cross-sectional area is smaller than the coil-facing width of the second cross-sectional area,
wherein the first drive magnet, the second drive magnet and the third drive magnet are arranged so as to adjoin one another,
wherein the third cross-sectional area undercuts the first cross-sectional area and the second cross-sectional area on the coil-averted side,
wherein the first cross-sectional area, the second cross-sectional area and the third cross-sectional area are each configured as an isosceles trapezoid, and
wherein the surface area of the first cross-sectional area, the surface area of the second cross-sectional area and the surface area of the third cross-sectional area are of equal size.

2. The magnet arrangement according to claim 1,
wherein a coil-facing side surface of the first drive magnet, a coil-facing side surface of the second drive magnet and a coil-facing side surface of the compensation magnet are of rectangular configuration.

3. The magnet arrangement according to claim 1,
wherein the magnet arrangement is arranged on a carrier device,
wherein the carrier device is composed of a non-magnetic material comprising aluminum.

4. The magnet arrangement according to claim 1,
wherein the magnet arrangement has a cover,
wherein the cover is arranged on the coil-facing side of the magnet arrangement.

5. A linear electric motor,
wherein the linear electric motor comprises a stator and a mover movable along the stator,
wherein the stator comprises drive coils arranged along the stator,
wherein the drive coils are configured for being connected to an electrical supply device for generating coil currents applied to the drive coils,
wherein the mover comprises a magnet arrangement for interacting with the drive coils of the stator,
wherein the magnet arrangement comprises at least a first drive magnet, a second drive magnet and a compensation magnet which are arranged between a coil-facing side of the magnet arrangement and a coil-averted side of the magnet arrangement,
wherein the compensation magnet is arranged between the first drive magnet and the second drive magnet,
wherein the first drive magnet has a magnetization which is oriented from the coil-averted side of the magnet arrangement in the direction of the coil-facing side of the magnet arrangement,
wherein the second drive magnet has a magnetization which is oriented from the coil-facing side of the magnet arrangement in the direction of the coil-averted side of the magnet arrangement,
wherein the compensation magnet has a magnetization which is oriented from the second drive magnet in the direction of the first drive magnet,
wherein the first drive magnet has a first cross-sectional area, the second drive magnet has a second cross-sectional area and the compensation magnet has a third cross-sectional area,
wherein a coil-averted width of the first cross-sectional area is smaller than a coil-facing width of the first cross-sectional area, and a coil-averted width of the second cross-sectional area is smaller than a coil-facing width of the second cross-sectional area,
wherein the third cross-sectional area undercuts the first cross-sectional area and the second cross-sectional area on the coil-averted side,
wherein the surface area of the first cross-sectional area, the surface area of the second cross-sectional area and the surface area of the third cross-sectional area are of equal size.

6. The linear electric motor according to claim 5,
wherein the magnet arrangement is arranged on a carrier device of the mover,
wherein the carrier device is composed of a non-magnetic material comprising aluminum.

7. The linear electric motor according to claim 5,
wherein the first cross-sectional area, the second cross-sectional area and the third cross-sectional area lie in a common section plane through the magnet arrangement, which section plane is oriented parallel to coil axes of the drive coils,
wherein the first cross-sectional area, the second cross-sectional area and the third cross-sectional area extend in the section plane in each case between the coil-facing side of the magnet arrangement and the coil-averted side of the magnet arrangement,
wherein a coil-facing width of the first cross-sectional area and a coil-facing width of the second cross-sectional area is in each case greater than a coil-facing width of the third cross-sectional area,
wherein a coil-averted width of the third cross-sectional area is greater than the coil-facing width of the third cross-sectional area, and
wherein the third cross-sectional area undercuts the first cross-sectional area and the second cross-sectional area on the coil-averted side.

8. The linear electric motor according to claim 7,
wherein the coil-averted width of the third cross-sectional area of the compensation magnet corresponds to the coil-facing width of the first cross-sectional area of the first drive magnet and to the coil-facing width of the second cross-sectional area of the second drive magnet, and
wherein the coil-facing width of the third cross-sectional area of the compensation magnet corresponds to the coil-averted width of the first cross-sectional area of the first drive magnet and to the coil-averted width of the second cross-sectional area of the second drive magnet.

9. The linear electric motor according to claim 7, wherein the surface area of the first cross-sectional area, the surface area of the second cross-sectional area and the surface area of the third cross-sectional area are of equal size.

10. The linear electric motor according to claim 7, wherein the first cross-sectional area, the second cross-sectional area and the third cross-sectional area are each configured as an isosceles trapezoid.

11. The linear electric motor according to claim 5,
wherein the drive coils of the electric motor interact, by means of pole teeth which are arranged spaced apart from one another by a pole spacing, with the magnet arrangement of the mover, and
wherein the highest common denominator of the pole spacing and of a magnet spacing between the first drive magnet and the second drive magnet of the magnet arrangement is equal to one.

12. The electric motor according to claim 10,
wherein the magnet arrangement has a number M of drive magnets which are in each case arranged so as to be spaced apart from one another by the magnet spacing, and
wherein M times the magnet spacing corresponds to an integer multiple of the pole spacing.

13. A mover for a linear electric motor,
wherein the mover comprises a magnet arrangement for interacting with drive coils of the electric motor,
wherein the magnet arrangement comprises at least a first drive magnet, a second drive magnet and a compensation magnet which are arranged between a coil-facing side of the magnet arrangement and a coil-averted side of the magnet arrangement,
wherein the compensation magnet is arranged between the first drive magnet and the second drive magnet,
wherein the first drive magnet has a magnetization which is oriented from the coil-averted side of the magnet arrangement in the direction of the coil-facing side of the magnet arrangement,
wherein the second drive magnet has a magnetization which is oriented from the coil-facing side of the magnet arrangement in the direction of the coil-averted side of the magnet arrangement,
wherein the compensation magnet has a magnetization which is oriented from the second drive magnet in the direction of the first drive magnet,
wherein the first drive magnet has a first cross-sectional area, the second drive magnet has a second cross-sectional area and the compensation magnet has a third cross-sectional area,
wherein the first cross-sectional area, the second cross-sectional area and the third cross-sectional area lie in a common section plane through the magnet arrangement, which section plane is oriented parallel to coil axes of the drive coils,
wherein the first cross-sectional area, the second cross-sectional area and the third cross-sectional area extend in the section plane in each case between the coil-facing side of the magnet arrangement and the coil-averted side of the magnet arrangement,
wherein a coil-facing width of the first cross-sectional area and a coil-facing width of the second cross-sectional area is in each case greater than a coil-facing width of the third cross-sectional area,
wherein a coil-averted width of the third cross-sectional area is greater than the coil-facing width of the third cross-sectional area, and
wherein the third cross-sectional area undercuts the first cross-sectional area and the second cross-sectional area on the coil-averted side.

* * * * *